(12) United States Patent
Huang

(10) Patent No.: US 11,838,616 B2
(45) Date of Patent: Dec. 5, 2023

(54) OPTICAL LENS ASSEMBLY AND PHOTOGRAPHING MODULE

(71) Applicant: NEWMAX TECHNOLOGY CO., LTD., Taichung (TW)

(72) Inventor: Ching-Yun Huang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 146 days.

(21) Appl. No.: 17/701,668

(22) Filed: Mar. 23, 2022

(65) Prior Publication Data

US 2023/0217091 A1 Jul. 6, 2023

(30) Foreign Application Priority Data

Jan. 3, 2022 (TW) .................................. 111100070

(51) Int. Cl.
| | |
|---|---|
| *H04N 23/55* | (2023.01) |
| *G02B 9/60* | (2006.01) |
| *G03B 17/12* | (2021.01) |
| *G02B 3/04* | (2006.01) |
| *G02B 13/00* | (2006.01) |

(52) U.S. Cl.
CPC .............. *H04N 23/55* (2023.01); *G02B 3/04* (2013.01); *G02B 9/60* (2013.01); *G02B 13/0045* (2013.01); *G03B 17/12* (2013.01)

(58) Field of Classification Search
CPC . H04N 23/55; G02B 3/04; G02B 9/60; G02B 13/0045; G02B 13/18; G03B 17/12
See application file for complete search history.

(56) References Cited

U.S. PATENT DOCUMENTS

| | | | |
|---|---|---|---|
| 2019/0196141 A1* | 6/2019 | Wang | G02B 13/18 |
| 2019/0204570 A1* | 7/2019 | Song | G02B 13/008 |
| 2020/0209598 A1* | 7/2020 | Sato | G02B 9/34 |
| 2020/0257081 A1* | 8/2020 | Huang | G02B 13/18 |

* cited by examiner

*Primary Examiner* — Kelly L Jerabek
(74) *Attorney, Agent, or Firm* — BRUCE STONE LLP; Joseph A. Bruce

(57) ABSTRACT

An optical lens assembly includes, in order from the object side to the image side: a first lens with negative refractive power, a second lens with positive refractive power, a stop, a third lens with positive refractive power, a fourth lens with positive refractive power, a fifth lens with negative refractive power, and an IR band-pass filter. A maximum field of view of the optical lens assembly is FOV, a f-number of the optical lens assembly is Fno, a distance from an object-side surface of the first lens to an image plane along an optical axis is TL, a distance from an image-side surface of the fifth lens to the image plane along the optical axis is BFL, an entrance pupil diameter of the optical lens assembly is EPD, and the following conditions are satisfied: $0.58<\text{FOV}/(\text{Fno}*100)<1.28$ and $4.76<(\text{TL}-\text{BFL})/\text{EPD}<12.03$.

20 Claims, 14 Drawing Sheets

OPTICAL LENS ASSEMBLY AND PHOTOGRAPHING MODULE

BACKGROUND

Field of the Invention

The present invention relates to an optical lens assembly and photographing module, and more particularly to an optical lens assembly and photographing module applicable to electronic products.

Description of Related Art

Present camera lenses with ultra-wide field of view have been applied in various electronic products, such as, smartphones, tablet computers, game players, dash cameras, security cameras, around view monitors and so on.

The camera lenses disposed to various electronic products have different configuration requirements, such as having a large aperture while having an ultra-wide angle, to adapt various situations. The existing camera lenses for various electronic products, especially intelligent electronic products applied in the 3D sensing technology, are difficult to meet all requirements of having both an ultra-wide field of view and a large aperture and providing a high relative illuminance The present invention mitigates and/or obviates the aforementioned disadvantages.

SUMMARY

One of objectives of the present invention is to provide an optical lens assembly and photographing module, where the optical lens assembly of the present invention is capable of meeting the demands of ultra-wide field of view and large aperture and also maintaining high image quality when one or more specific conditions are satisfied.

Therefore, an optical lens assembly includes, in order from an object side to an image side: a first lens with negative refractive power, including an object-side surface and an image-side surface, the object-side surface of the first lens being convex in a paraxial region thereof, and the image-side surface of the first lens being concave in a paraxial region thereof; a second lens with positive refractive power, including an object-side surface and an image-side surface, the object-side surface of the second lens being concave in a paraxial region thereof, the image-side surface of the second lens being convex in a paraxial region thereof, and one of the object-side surface and the image-side surface of the second lens being aspheric; a stop; a third lens with positive refractive power, including an object-side surface and an image-side surface, the object-side surface of the third lens being convex in a paraxial region thereof, the image-side surface of the third lens being convex in a paraxial region thereof, and one of the object-side surface and the image-side surface of the third lens being aspheric; a fourth lens with positive refractive power, including an object-side surface and an image-side surface, the object-side surface of the fourth lens being concave in a paraxial region thereof, the image-side surface of the fourth lens being convex in a paraxial region thereof, and one of the object-side surface and the image-side surface of the fourth lens being aspheric; a fifth lens with negative refractive power, including an object-side surface and an image-side surface, the object-side surface of the fifth lens being convex in a paraxial region thereof, the image-side surface of the fifth lens being concave in a paraxial region thereof, and one of the object-side surface and the image-side surface of the fifth lens being aspheric; and an IR band-pass filter, wherein a maximum field of view of the optical lens assembly is FOV, a f-number of the optical lens assembly is Fno, a distance from the object-side surface of the first lens to an image plane along an optical axis is TL, a distance from the image-side surface of the fifth lens to the image plane along the optical axis is BFL, an entrance pupil diameter of the optical lens assembly is EPD, and the optical lens assembly satisfies following conditions: $0.58 < FOV/(Fno*100) < 1.28$; and $4.76 < (TL-BFL)/EPD < 12.03$.

Optionally, the optical lens assembly has a total of five lenses with refractive power.

The present invention has benefits as follows in this embodiment. When the above five lenses with refractive power satisfy the condition, $0.58 < FOV/(Fno*100) < 1.28$, the settings of the aperture size and the field of view of the optical lens assembly may be optimized for the optimal image quality. When the above five lenses with refractive power satisfy the condition, $4.76 < (TL-BFL)/EPD < 12.03$, suitable lens formability and a back focal length may be maintained.

A focal length of the optical lens assembly is f, a focal length of the first lens is f1, and the optical lens assembly further satisfies a following condition: $-0.36 < f/f1 < -0.16$, so that the ratio of the focal length of the first lens to the focal length of the optical lens assembly can enhance the wide-angle characteristic of the optical lens assembly, so as to provide a larger field of view of the optical lens assembly and maintain the illuminance of the optical lens assembly.

The focal length of the optical lens assembly is f, a focal length of the third lens is f3, and the optical lens assembly further satisfies a following condition: $0.38 < f/f3 < 0.82$, so that the ratio of the focal length of the third lens to the focal length of the optical lens assembly can enhance the image resolution of the optical lens assembly.

A focal length of the fifth lens is f5, the focal length of the first lens is f1, and the optical lens assembly further satisfies a following condition: $0.5 < f5/f1 < 2.82$, thereby achieving more appropriate distribution of the refractive power of the optical lens assembly to reduce the aberration.

A focal length of the second lens is f2, the focal length of the third lens is f3, a focal length of the fourth lens is f4, the focal length of the fifth lens is f5, and the optical lens assembly further satisfies a following condition: $-1.14 < f3q5/(f2q4) < -0.09$, thereby achieving more appropriate distribution of the refractive power of the optical lens assembly to improve the image quality of the optical lens assembly.

The focal length of the third lens is f3, a distance from the image-side surface of the second lens to the object-side surface of the third lens along the optical axis is T23, and the optical lens assembly further satisfies a following condition: $1.54 < f3*T23 < 7.9$, which is conducive to reducing the assembly sensitivity of the optical lens assembly.

A central thickness of the fourth lens along the optical axis is CT4, a displacement in parallel to the optical axis from an intersection between the object-side surface of the fourth lens and the optical axis to a maximum effective radius position on the object-side surface of the fourth lens is TDP7, and the optical lens assembly further satisfies a following condition: $0.61 < CT4/TDP7 < 1.54$, thereby achieving the optimal performance of the optical lens assembly and the optimal assembly stability of the fourth lens.

The distance from the image-side surface of the fifth lens to the image plane along the optical axis is BFL, a central thickness of the fifth lens along the optical axis is CT5, and the optical lens assembly further satisfies a following condition: 1.02<BFL/CT5<2.55, which is favorable to achieving a proper balance between the lens formability and the refractive power of the fifth lens.

A central thickness of the second lens along the optical axis is CT2, a central thickness of the first lens along the optical axis is CT1, and the optical lens assembly further satisfies a following condition: 1.12<CT2/CT1<2.5, which is conducive to providing more appropriate thickness arrangement of the first lens and the second lens of the optical lens assembly to reduce the manufacturing and assembly tolerances.

The central thickness of the first lens along the optical axis is CT1, the central thickness of the second lens along the optical axis is CT2, a central thickness of the third lens along the optical axis is CT3, the central thickness of the fourth lens along the optical axis is CT4, the central thickness of the fifth lens along the optical axis is CT5, and the optical lens assembly further satisfies a following condition: 0.47<(CT1+CT2)/(CT3+CT4+CT5)<1.51, thereby achieving more appropriate collection of the lenses of the optical lens assembly, which is favorable to achieving a balance between the miniaturization and performance of the optical lens assembly.

A displacement in parallel to the optical axis from an intersection between the image-side surface of the first lens and the optical axis to a maximum effective radius position on the image-side surface of the first lens is TDP2, the entrance pupil diameter of the optical lens assembly is EPD, and the optical lens assembly further satisfies a following condition: 0.95<TDP2/EPD<2.35, which is conducive to providing a large aperture and optimizing the formability of the first lens.

An Abbe number of the first lens is vd1, an Abbe number of the second lens is vd2, a refractive index of the first lens is nd1, and the optical lens assembly further satisfies a following condition: 1.21<(vd1*nd1)/vd2<5.57, thereby achieving more appropriate arrangement of the first lens and the second lens in material to provide a larger field of view and appropriate illuminance.

A radius of curvature of the image-side surface of the first lens is R2, the refractive index of the first lens is nd1, and the optical lens assembly further satisfies a following condition: 0.88<R2/nd1<2.91, which is conducive to optimizing the balance between the lens formability and the performance of the optical lens assembly under the selection of different materials for the first lens.

The distance from the object-side surface of the first lens to the image plane along the optical axis is TL, a maximum image height of the optical lens assembly is IMH (which is usually a half of a diagonal length of an effective pixel area of an image sensor, and however, may be less than or greater than a half of the diagonal length of the effective pixel area of the image sensor, depending on to the usage characteristics of electronic products disposed with the optical lens assembly), and the optical lens assembly further satisfies a following condition: 3.68<TL/IMH<5.92, which is favorable to achieving a proper balance between the miniaturization of the optical lens assembly and the size of the effective pixel area.

The maximum field of view of the optical lens assembly is FOV, and the optical lens assembly further satisfies a following condition: 102.97<FOV<147.66, which is conducive to providing the optical lens assembly with the characteristic of ultra-wide angle.

Moreover, a photographing module in accordance with one of aspects of the present invention includes a lens barrel, an optical lens assembly disposed in the lens barrel, and an image sensor disposed on an image plane of the optical lens assembly. The optical lens assembly includes, in order from an object side to an image side: a first lens with negative refractive power, including an object-side surface and an image-side surface, the object-side surface of the first lens being convex in a paraxial region thereof, and the image-side surface of the first lens being concave in a paraxial region thereof; a second lens with positive refractive power, including an object-side surface and an image-side surface, the object-side surface of the second lens being concave in a paraxial region thereof, the image-side surface of the second lens being convex in a paraxial region thereof, and one of the object-side surface and the image-side surface of the second lens being aspheric; a stop; a third lens with positive refractive power, including an object-side surface and an image-side surface, the object-side surface of the third lens being convex in a paraxial region thereof, the image-side surface of the third lens being convex in a paraxial region thereof, and one of the object-side surface and the image-side surface of the third lens being aspheric; a fourth lens with positive refractive power, including an object-side surface and an image-side surface, the object-side surface of the fourth lens being concave in a paraxial region thereof, the image-side surface of the fourth lens being convex in a paraxial region thereof, and one of the object-side surface and the image-side surface of the fourth lens being aspheric; a fifth lens with negative refractive power, including an object-side surface and an image-side surface, the object-side surface of the fifth lens being convex in a paraxial region thereof, the image-side surface of the fifth lens being concave in a paraxial region thereof, and one of the object-side surface and the image-side surface of the fifth lens being aspheric; and an IR band-pass filter, wherein a maximum field of view of the optical lens assembly is FOV, a f-number of the optical lens assembly is Fno, a distance from the object-side surface of the first lens to an image plane along the optical axis is TL, a distance from the image-side surface of the fifth lens to the image plane along the optical axis is BFL, an entrance pupil diameter of the optical lens assembly is EPD, and the optical lens assembly satisfies following conditions: 0.58<FOV/(Fno*100)<1.28; and 4.76<(TL−BFL)/EPD<12.03.

Optionally, the optical lens assembly has a total of five lenses with refractive power.

The present invention has benefits as follows. When the above five lenses with refractive power satisfy the condition, 0.58<FOV/(Fno*100)<1.28, the settings of the aperture size and the field of view of the optical lens assembly can be optimized for the best image quality. When the above five lenses with refractive power satisfy the condition, 4.76<(TL−BFL)/EPD<12.03, suitable lens formability and a suitable back focal length can be maintained.

A focal length of the optical lens assembly is f, a focal length of the first lens is f1, and the optical lens assembly further satisfies a following condition: −0.36<f/f1<−0.16, so that the ratio of the focal length of the first lens to the focal length of the lens assembly can enhance the wide-angle characteristic of the optical lens assembly, so as to provide a larger field of view of the photographing module and maintain the system illuminance.

The focal length of the optical lens assembly is f, a focal length of the third lens is f3, and the optical lens assembly further satisfies a following condition: 0.38<f/f3<0.82, so that the ratio of the focal length of the third lens to the focal length of the lens assembly can enhance the image resolution of the optical lens assembly.

A focal length of the fifth lens is f5, the focal length of the first lens is f1, and the optical lens assembly further satisfies a following condition: 0.5<f5/f1<2.82, thereby achieving more appropriate distribution of the refractive power of the optical lens assembly to reduce the aberration.

A focal length of the second lens is f2, the focal length of the third lens is f3, a focal length of the fourth lens is f4, the focal length of the fifth lens is f5, and the optical lens assembly further satisfies a following condition: −1.14<f3q5/(f2q4)<−0.09, thereby achieving more appropriate distribution of the refractive power of the optical lens assembly to improve the image quality of the optical lens assembly.

The focal length of the third lens is f3, a distance from the image-side surface of the second lens to the object-side surface of the third lens along the optical axis is T23, and the optical lens assembly further satisfies a following condition: 1.54<f3*T23<7.9, which can reduce the assembly sensitivity of the optical lens assembly.

A central thickness of the fourth lens along the optical axis is CT4, a displacement in parallel to the optical axis from an intersection between the object-side surface of the fourth lens and the optical axis to a maximum effective radius position on the object-side surface of the fourth lens is TDP7, and the optical lens assembly further satisfies a following condition: 0.61<CT4/TDP7<1.54, thereby achieving optimal performance of the optical lens assembly and the optimal assembly stability of the fourth lens.

The distance from the image-side surface of the fifth lens to the image plane along the optical axis is BFL, a central thickness of the fifth lens along the optical axis is CT5, and the optical lens assembly further satisfies a following condition: 1.02<BFL/CT5<2.55, which is favorable to achieving a proper balance between the lens formability and the refractive power of the fifth lens.

A central thickness of the second lens along the optical axis is CT2, a central thickness of the first lens along the optical axis is CT1, and the optical lens assembly further satisfies a following condition: 1.12<CT2/CT1<2.5, which is conducive to providing more appropriate thicknesses arrangement of the first lens and the second lens of the optical lens assembly to reduce the manufacturing and assembly tolerances.

The central thickness of the first lens along the optical axis is CT1, the central thickness of the second lens along the optical axis is CT2, a central thickness of the third lens along the optical axis is CT3, the central thickness of the fourth lens along the optical axis is CT4, the central thickness of the fifth lens along the optical axis is CT5, and the optical lens assembly further satisfies a following condition: 0.47<(CT1+CT2)/(CT3+CT4+CT5)<1.51, thereby achieving more appropriate collection of the lenses of the optical lens assembly, which is favorable to achieving a balance between the miniaturization and performance of the optical lens assembly.

A displacement in parallel to the optical axis from an intersection between the image-side surface of the first lens and the optical axis to a maximum effective radius position on the image-side surface of the first lens is TDP2, the entrance pupil diameter of the optical lens assembly is EPD, and the optical lens assembly further satisfies a following condition: 0.95<TDP2/EPD<2.35, which is conducive to providing a large aperture and optimize the formability of the first lens.

An Abbe number of the first lens is vd1, an Abbe number of the second lens is vd2, a refractive index of the first lens is nd1, and the optical lens assembly further satisfies a following condition: 1.21<(vd1*nd1)/vd2<5.57, thereby achieving more appropriate arrangement of the first lens and the second lens in material to provide a larger field of view and appropriate illuminance.

A radius of curvature of the image-side surface of the first lens is R2, the refractive index of the first lens is nd1, and the optical lens assembly further satisfies a following condition: 0.88<R2/nd1<2.91, which is conducive to optimizing the balance between the lens formability and the performance of the optical lens assembly under the selection of different materials for the first lens.

The distance from the object-side surface of the first lens to the image plane along the optical axis is TL, a maximum image height of the optical lens assembly is IMH (which is usually a half of a diagonal length of an effective pixel area of an image sensor, and however, may be less than or greater than a half of the diagonal length of the effective pixel area of the image sensor, depending on to the usage characteristics of electronic products disposed with the optical lens assembly), and the optical lens assembly further satisfies a following condition: 3.68<TL/IMH<5.92, which is favorable to achieving a proper balance between the miniaturization of the optical lens assembly and the size of the effective pixel area.

The optical lens assembly has the maximum field of view of the optical lens assembly is FOV, and the optical lens assembly further satisfies a following condition: 102.97<FOV<147.66, which is favorite to providing the optical lens assembly with the characteristic of ultra-wide angle.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
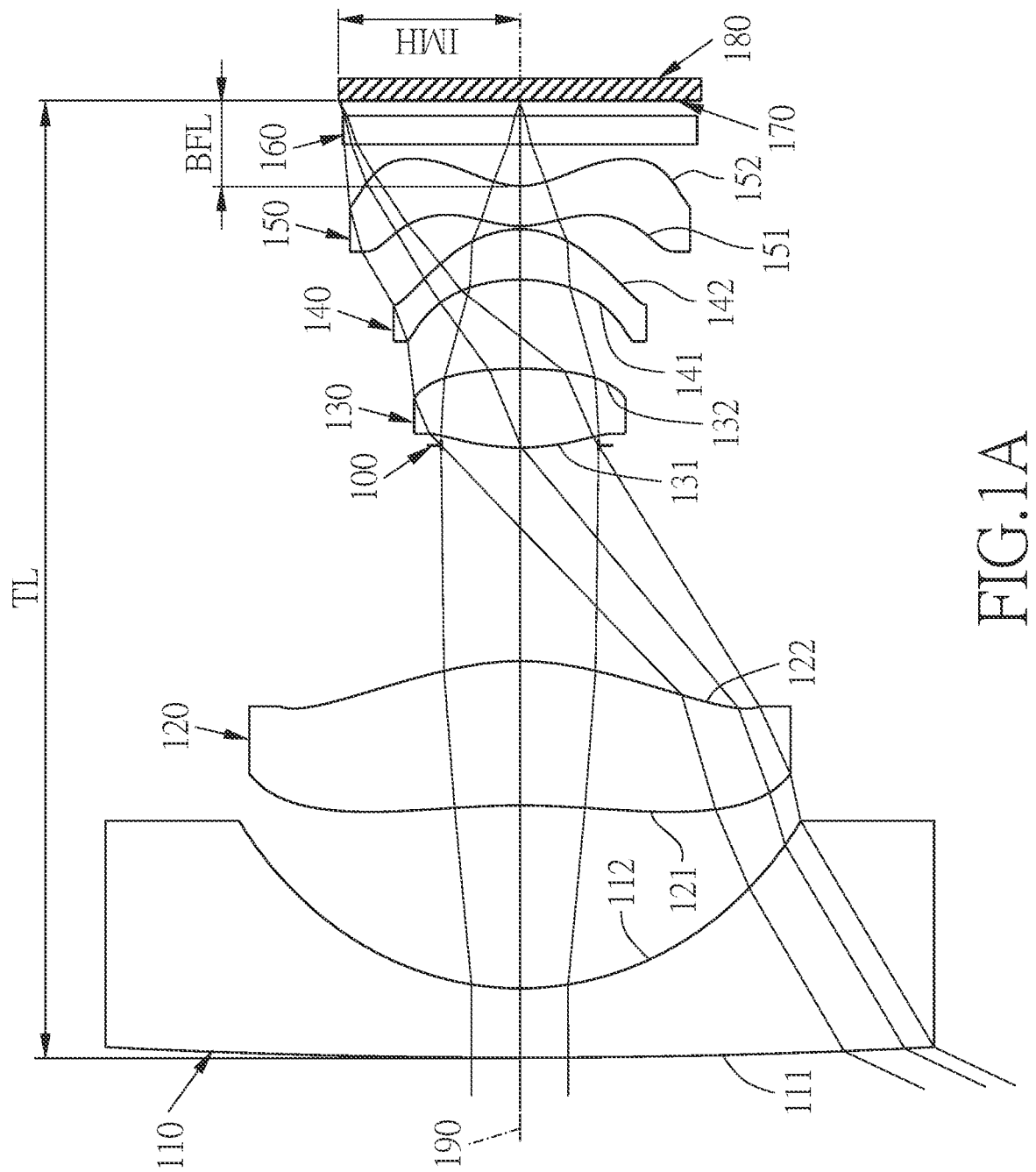
FIG. 1A shows an optical lens assembly in accordance with a first embodiment of the present invention.
Figure 1B:
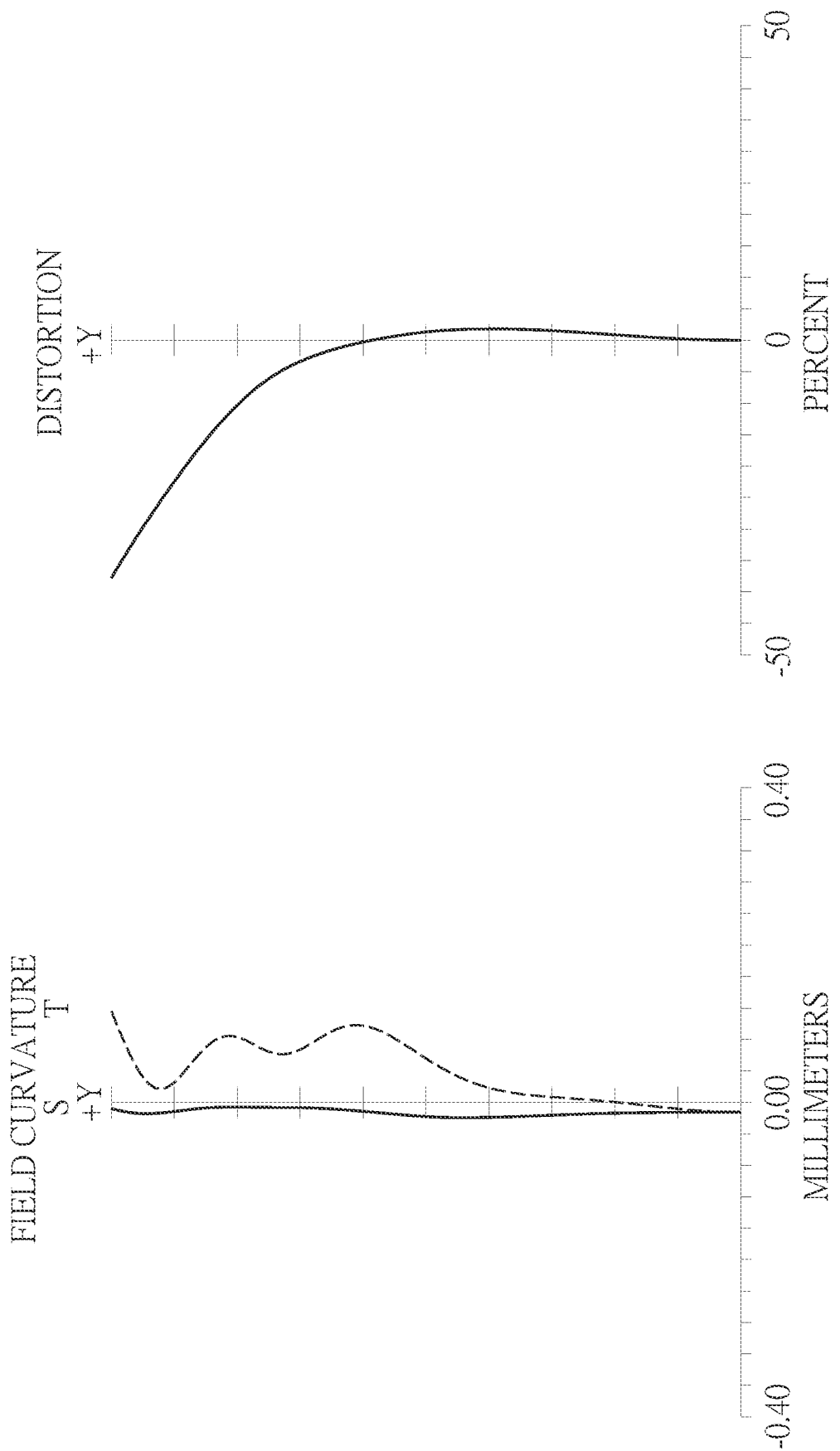
FIG. 1B shows the field curvature curve and the distortion curve of the optical lens assembly in the first embodiment of the present invention in order from left to right.

Referring to FIGS. 1A and 1B, FIG. 1A shows an optical lens assembly in accordance with a first embodiment of the present invention, and FIG. 1B shows, in order from left to right, the field curvature curve and the distortion curve of the first embodiment of the present invention. As shown in FIG. 1A, an optical lens assembly in accordance with the first embodiment of the present invention includes, in order from an object side to an image side along an optical axis 190: a first lens 110, a second lens 120, a stop 100, a third lens 130, a fourth lens 140, a fifth lens 150, an IR band-pass filter 160, and an image plane 170. The optical lens assembly has a total of five lenses with refractive power but is not limited thereto. The optical lens assembly works in cooperation with an image sensor 180. The image sensor 180 is disposed on the image plane 170.

The first lens 110 with negative refractive power includes an object-side surface 111 and an image-side surface 112, the object-side surface 111 of the first lens 110 is convex in a paraxial region thereof, the image-side surface 112 of the first lens 110 is concave in a paraxial region thereof, and the first lens 110 is made of glass material.

The second lens 120 with positive refractive power includes an object-side surface 121 and an image-side surface 122, the object-side surface 121 of the second lens 120 is concave in a paraxial region thereof, the image-side surface 122 of the second lens 120 is convex in a paraxial region thereof, the object-side surface 121 and the image-side surface 122 of the second lens 120 are aspheric, and the second lens 120 is made of plastic material.

The third lens 130 with positive refractive power includes an object-side surface 131 and an image-side surface 132, the object-side surface 131 of the third lens 130 is convex in a paraxial region thereof, the image-side surface 132 of the third lens 130 is convex in a paraxial region thereof, the object-side surface 131 and the image-side surface 132 of the third lens 130 are aspheric, and the third lens 130 is made of plastic material.

The fourth lens 140 with positive refractive power includes an object-side surface 141 and an image-side surface 142, the object-side surface 141 of the fourth lens 140 is concave in a paraxial region thereof, the image-side surface 142 of the fourth lens 140 is convex in a paraxial region thereof, the object-side surface 141 and the image-side surface 142 of the fourth lens 140 are aspheric, and the fourth lens 140 is made of plastic material.

The fifth lens 150 with negative refractive power includes an object-side surface 151 and an image-side surface 152, the object-side surface 151 of the fifth lens 150 is convex in a paraxial region thereof, the image-side surface 152 of the fifth lens 150 is concave in a paraxial region thereof, the object-side surface 151 and the image-side surface 152 of the fifth lens 150 are aspheric, and the fifth lens 150 is made of plastic material.

The IR band-pass filter 160 is made of glass, is located between the fifth lens 150 and the image plane 170, and has no influence on the focal length of the optical lens assembly. A filter which allows light in the light wavelength range of 940 nm±30 nm to pass therethrough, is selected in this embodiment, but not limited thereto.

The equation for the aspheric surface profiles of the respective lenses of the first embodiment is expressed as follows:

$$z(h) = \frac{ch^2}{1 + [1 - (k+1)c^2h^2]^{0.5}} + \sum (A_i) \cdot (h^i)$$

wherein:

z represents the value of a reference position at a height of h with respect to a vertex of the surface of a lens along the optical axis 190;

c represents a paraxial curvature equal to 1/R (R: a paraxial radius of curvature);

h represents a vertical distance from the point on the curve of the aspheric surface to the optical axis 190;

k represents the conic constant; and $A_i$ represents the i-order aspheric coefficients.

In the first embodiment of the present optical lens assembly, a focal length of the optical lens assembly is f, an entrance pupil diameter of the optical lens assembly is EPD, a f-number of the optical lens assembly is Fno, a maximum field of view of the optical lens assembly is FOV, a maximum image height of the optical lens assembly is IMH, and the values of these parameters are listed as follows: f=1.42 mm; EPD=1.13 mm; Fno=1.26; FOV=134.2 degrees; and IMH=2.10 mm.

In the first embodiment of the present optical lens assembly, the maximum field of view of the optical lens assembly is FOV, the f-number of the optical lens assembly is Fno, a distance from the object-side surface 111 of the first lens 110 to the image plane 170 along the optical axis 190 is TL, a distance from the image-side surface 152 of the fifth lens 150 to the image plane 170 along the optical axis 190 is BFL, the entrance pupil diameter of the optical lens assembly is EPD, and the following conditions are satisfied: FOV/(Fno*100)=1.07 and (TL−BFL)/EPD=8.00.

In the first embodiment of the present optical lens assembly, the focal length of the optical lens assembly is f, a focal length of the first lens 110 is f1, and the following condition is satisfied: f/f1=−0.26.

In the first embodiment of the present optical lens assembly, the focal length of the optical lens assembly is f, a focal length of the third lens 130 is f3, and the following condition is satisfied: f/f3=0.48.

In the first embodiment of the present optical lens assembly, a focal length of the fifth lens 150 is f5, the focal length of the first lens 110 is f1, and the following condition is satisfied: f5/f1=2.02.

In the first embodiment of the present optical lens assembly, a focal length of the second lens 120 is f2, the focal length of the third lens 130 is f3, a focal length of the fourth lens 140 is f4, the focal length of the fifth lens 150 is f5, and the following condition is satisfied: f3*f5/(f2*f4)=−0.95.

In the first embodiment of the present optical lens assembly, the focal length of the third lens 130 is f3, a distance from the image-side surface 122 of the second lens 120 to the object-side surface 131 of the third lens 130 along the optical axis 190 is T23, and the following condition is satisfied: f3*T23=6.58.

Figure 9:
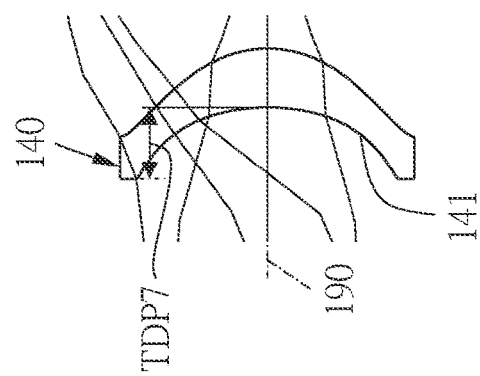
FIG. 9 shows a fourth lens with a parameter TDP7 in accordance with the first embodiment of the present invention.

In the first embodiment of the present optical lens assembly, a central thickness of the fourth lens 140 along the optical axis 190 is CT4, as shown in FIG. 9, a displacement in parallel to the optical axis 190 from an intersection between the object-side surface 141 of the fourth lens 140 and the optical axis 190 to a maximum effective radius position on the object-side surface 141 of the fourth lens 140 is TDP7, and the following condition is satisfied: CT4/TDP7=0.81.

In the first embodiment of the present optical lens assembly, the distance from the image-side surface 152 of the fifth lens 150 to the image plane 170 along the optical axis 190 is BFL, a central thickness of the fifth lens 150 along the optical axis 190 is CT5, and the following condition is satisfied: BFL/CT5=2.12.

In the first embodiment of the present optical lens assembly, a central thickness of the second lens 120 along the optical axis 190 is CT2, a central thickness of the first lens 110 along the optical axis 190 is CT1, and the following condition is satisfied: CT2/CT1=2.09.

In the first embodiment of the present optical lens assembly, the central thickness of the first lens 110 along the optical axis 190 is CT1, the central thickness of the second lens 120 along the optical axis 190 is CT2, a central thickness of the third lens 130 along the optical axis 190 is CT3, the central thickness of the fourth lens 140 along the optical axis 190 is CT4, the central thickness of the fifth lens 150 along the optical axis 190 is CT5, and the following condition is satisfied: (CT1+CT2)/(CT3+CT4+CT5)=1.26.

Figure 8:
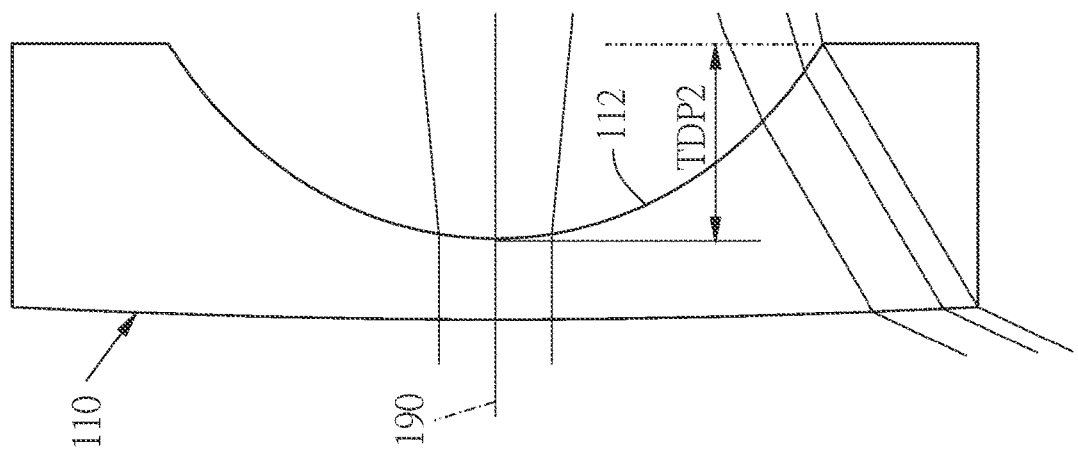
FIG. 8 shows a first lens with a parameter TDP2 in accordance with the first embodiment of the present invention.

In the first embodiment of the present optical lens assembly, as shown in FIG. 8, a displacement in parallel to the optical axis 190 from an intersection between the image-side surface 112 of the first lens 110 and the optical axis 190 to a maximum effective radius position on the image-side surface 112 of the first lens 110 is TDP2, the entrance pupil diameter of the optical lens assembly is EPD, and the following condition is satisfied: TDP2/EPD=1.54.

In the first embodiment of the present optical lens assembly, an Abbe number of the first lens 110 is vd1, an Abbe number of the second lens 120 is vd2, a refractive index of the first lens 110 is nd1, and the following condition is satisfied: (vd1*nd1)/vd2=3.92.

In the first embodiment of the present optical lens assembly, a radius of curvature of the image-side surface 112 of the first lens 110 is R2, the refractive index of the first lens 110 is nd1, and the following condition is satisfied: R2/nd1=2.22.

In the first embodiment of the present optical lens assembly, the distance from the object-side surface 111 of the first lens 110 to the image plane 170 along the optical axis 190 is TL, the maximum image height of the optical lens assembly is IMH, and the following condition is satisfied: TL/IMH=4.72, wherein IMH is, for example but not limited to, a half of a diagonal length of an effective pixel area of the image sensor.

The detailed optical data of the first embodiment is shown in Table 1, and the aspheric surface data of the first embodiment is shown in Table 2.

TABLE 1

Embodiment 1
f = 1.42 mm, Fno = 1.26, FOV = 134.2 deg.

| surface | | Curvature Radius | | Thickness/gap | Material | Index (nd) | Abbe # (vd) | Focal length |
|---|---|---|---|---|---|---|---|---|
| 0 | Object | infinity | | 1500 | | | | |
| 1 | Lens 1 | 106.441 | | 0.717 | glass | 1.773 | 49.6 | −5.42 |
| 2 | | 3.939 | | 1.894 | | | | |
| 3 | Lens 2 | −9.380 | (ASP) | 1.495 | plastic | 1.643 | 22.5 | 8.19 |
| 4 | | −3.499 | (ASP) | 2.232 | | | | |
| 5 | Stop | infinity | | −0.021 | | | | |
| 6 | Lens 3 | 2.984 | (ASP) | 0.819 | plastic | 1.643 | 22.5 | 2.98 |
| 7 | | −4.349 | (ASP) | 0.923 | | | | |
| 8 | Lens 4 | −1.965 | (ASP) | 0.523 | plastic | 1.643 | 22.5 | 4.20 |
| 9 | | −1.235 | (ASP) | 0.031 | | | | |
| 10 | Lens 5 | 1.293 | (ASP) | 0.413 | plastic | 1.643 | 22.5 | −10.97 |
| 11 | | 0.954 | (ASP) | 0.431 | | | | |
| 12 | IR band-pass filter | infinity | | 0.300 | glass | 1.517 | 64.2 | |
| 13 | | infinity | | 0.147 | | | | |
| 14 | Image plane | infinity | | — | | | | |

Note:
the reference wavelength is 940 nm

TABLE 2

| Aspheric Coefficients | | | | |
|---|---|---|---|---|
| Surface | 3 | 4 | 6 | 7 |
| K: | −5.9626E+01 | −1.5927E+00 | −4.3477E+00 | −8.5935E+01 |
| A2: | 0.0000E+00 | 0.0000E+00 | 0.0000E+00 | 0.0000E+00 |
| A4: | 7.7044E−03 | 1.8967E−02 | 2.3585E−02 | −1.0034E−01 |
| A6: | −1.1165E−03 | −3.7977E−03 | −8.8871E−02 | 8.5620E−02 |

TABLE 2-continued

Aspheric Coefficients

| | | | | |
|---|---|---|---|---|
| A8: | 1.3104E−04 | 4.4968E−04 | −4.9145E−01 | −7.7102E−02 |
| A10: | 6.9379E−06 | 1.9960E−05 | −4.9145E−01 | 1.6246E−02 |
| A12: | −2.7233E−06 | −1.0777E−05 | 6.3282E−01 | 2.6643E−02 |
| A14: | 1.7879E−07 | 7.9431E−07 | −4.7272E−01 | −3.3946E−02 |
| A16: | −2.6641E−10 | 1.0540E−08 | 1.5550E−01 | 9.8562E−03 |
| A18: | 2.1737E−10 | −4.3802E−10 | 3.2711E−04 | 1.5984E−03 |
| A20: | −2.8627E−11 | −1.2166E−10 | −8.4099E−03 | −8.4432E−04 |

| Surface | 8 | 9 | 10 | 11 |
|---|---|---|---|---|
| K: | −1.9707E+01 | −3.7918E+00 | −5.3512E−01 | −1.7603E+00 |
| A2: | 0.0000E+00 | 0.0000E+00 | 0.0000E+00 | 0.0000E+00 |
| A4: | −1.2447E−01 | −1.8052E−01 | −4.4161E−01 | −3.0704E−01 |
| A6: | −9.1112E−02 | 6.6988E−02 | 1.4050E−01 | 1.6297E−01 |
| A8: | 8.9362E−02 | −2.2009E−02 | 4.2289E−03 | −5.0598E−02 |
| A10: | 4.5175E−03 | 3.4106E−02 | −1.8868E−02 | 7.1933E−03 |
| A12: | −1.1407E−02 | −2.1286E−02 | 1.3680E−03 | −2.1543E−04 |
| A14: | −2.8269E−02 | 3.3244E−03 | 9.2699E−04 | −1.9659E−04 |
| A16: | 1.9163E−02 | −5.6180E−04 | 1.0109E−05 | 1.0387E−04 |
| A18: | −5.2976E−03 | 1.0811E−03 | −4.8401E−06 | −3.0100E−05 |
| A20: | 1.4651E−03 | −2.7603E−04 | −8.1041E−06 | 3.4987E−06 |

In Table 1, the units of the radius of curvature, the thickness and the focal length are expressed in mm, the surface numbers 0-14 represent the surfaces sequentially arranged from the object-side to the image-side along the optical axis 190, wherein the surface 0 represents a gap between the object and the object-side surface 111 of the first lens 110 along the optical axis 190; the surfaces 1, 3, 6, 8, 10, 12 are thicknesses of the first lens 110, the second lens 120, the third lens 130, the fourth lens 140, the fifth lens 150 and the IR band-pass filter 160 along the optical axis 190, respectively; the surface 2 represents a gap between the first lens 110 and the second lens 120 along the optical axis 190; the surface 4 represents a gap between the second lens 120 and the stop 100 along the optical axis 190; the surface 5 represents a gap between the stop 100 and the object-side surface 131 of the third lens 130 along the optical axis 190; the stop 100 is farther away from the object-side than the object-side surface 131 of the third lens 130, so its thickness/gap value is expressed as a negative value; the surface 7 represents a gap between the third lens 130 and the object-side surface 141 of the fourth lens 140 along the optical axis 190; the surface 9 represents a gap between the fourth lens 140 and the fifth lens 150 along the optical axis 190; the surface 11 represents a gap between the fifth lens 150 and the IR band-pass filter 160 along the optical axis 190; and the surface 13 represents a gap between the IR band-pass filter 160 and the image plane 170 along the optical axis 190.

In table 2, k represents the conic coefficient of the equation of the aspheric surface profiles, and A2, A4, A6, A8, A10, A12, A14, A16, A18, and A20 represent the high-order aspheric coefficients.

The respective table presented below for respective one of other embodiments is based on the schematic view and field curvature curve of this embodiment, and the definitions of parameters in the tables are the same as those in Table 1 and Table 2 of the first embodiment. Therefore, an explanation in this regard will not be provided again.

Moreover, in each of the embodiments of the present invention, the maximum effective radius of either of surfaces of one lens is usually a vertical distance between an intersection of a ray, passing through the edge of the entrance pupil, in the incident light at a maximum view angle of the optical lens assembly and the surface of the lens and the optical axis, or is a radius of a part of the surface of the lens which is not subjected to any surface treatment (e.g., forming a concave and convex structure, or performing ink coating, etc. on the surface of the lens), or a radius of a light-transmissive part of the lens (as a shield or spacing ring, etc. blocks another part of the lens), but not limited thereto.

Second Embodiment

Figure 2A:
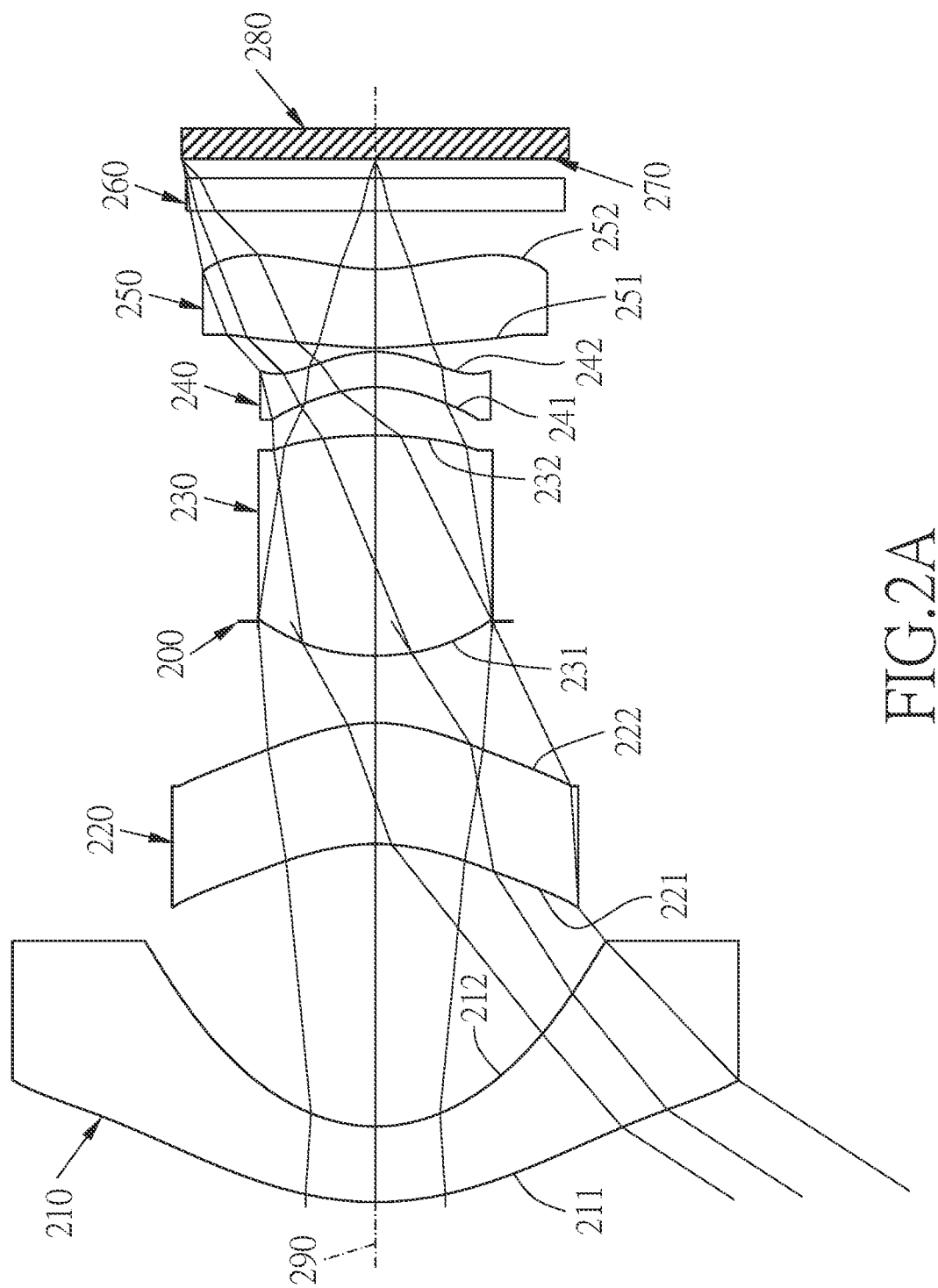
FIG. 2A shows an optical lens assembly in accordance with a second embodiment of the present invention.
Figure 2B:
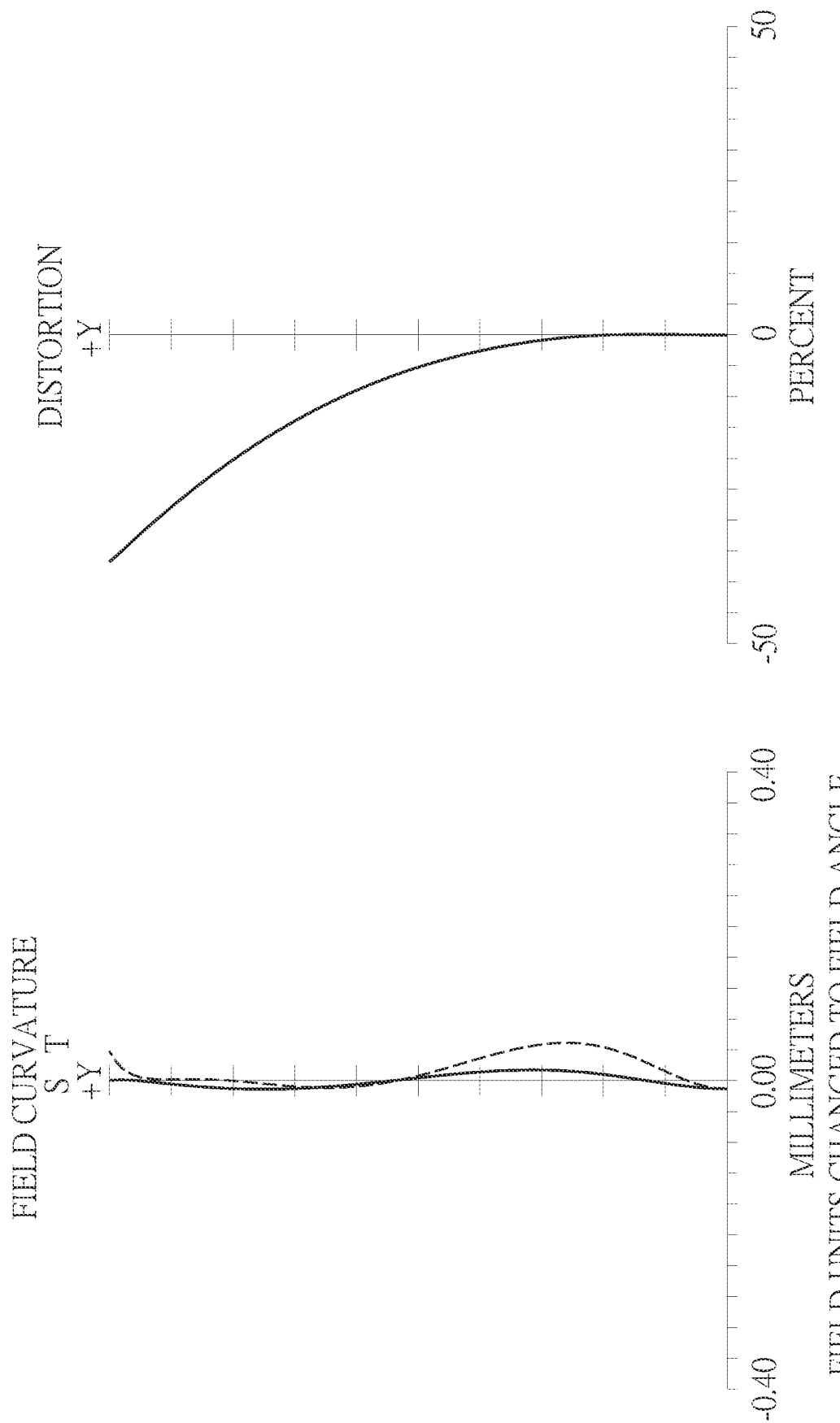
FIG. 2B shows the field curvature curve and the distortion curve of the optical lens assembly in the second embodiment of the present invention in order from left to right.

Referring to FIGS. 2A and 2B, FIG. 2A shows an optical lens assembly in accordance with a second embodiment of the present invention, and FIG. 2B shows, in order from left to right, the field curvature curve and the distortion curve of the second embodiment of the present invention. An optical lens assembly in accordance with the second embodiment of the present invention includes, in order from an object side to an image side along an optical axis 290: a first lens 210, a second lens 220, a stop 200, a third lens 230, a fourth lens 240, a fifth lens 250, an IR band-pass filter 260, and an image plane 270. The optical lens assembly has a total of five lenses with refractive power, but not limited thereto. The optical lens assembly works in cooperation with an image sensor 280. The image sensor 280 is disposed on the image plane 270.

The first lens 210 with negative refractive power includes an object-side surface 211 and an image-side surface 212, the object-side surface 211 of the first lens 210 is convex in a paraxial region thereof, the image-side surface 212 of the first lens 210 is concave in a paraxial region thereof, the object-side surface 211 and the image-side surface 212 of the first lens 210 are aspheric, and the first lens 210 is made of plastic material.

The second lens 220 with positive refractive power includes an object-side surface 221 and an image-side surface 222, the object-side surface 221 of the second lens 220 is concave in a paraxial region thereof, the image-side surface 222 of the second lens 220 is convex in a paraxial region thereof, the object-side surface 221 and the image-side surface 222 of the second lens 220 are aspheric, and the second lens 220 is made of plastic material.

The third lens 230 with positive refractive power includes an object-side surface 231 and an image-side surface 232, the object-side surface 231 of the third lens 230 is convex in a paraxial region thereof, the image-side surface 232 of the third lens 230 is convex in a paraxial region thereof, the object-side surface 231 and the image-side surface 232 of the third lens 230 are aspheric, and the third lens 230 is made of plastic material.

The fourth lens 240 with positive refractive power includes an object-side surface 241 and an image-side surface 242, the object-side surface 241 of the fourth lens 240 is concave in a paraxial region thereof, the image-side surface 242 of the fourth lens 240 is convex in a paraxial region thereof, the object-side surface 241 and the image-side surface 242 of the fourth lens 240 are aspheric, and the fourth lens 240 is made of plastic material.

The fifth lens 250 with negative refractive power includes an object-side surface 251 and an image-side surface 252, the object-side surface 251 of the fifth lens 250 is convex in a paraxial region thereof, the image-side surface 252 of the fifth lens 250 is concave in a paraxial region thereof, the object-side surface 251 and the image-side surface 252 of the fifth lens 250 are aspheric, and the fifth lens 250 is made of plastic material.

The IR band-pass filter 260 made of glass is located between the fifth lens 250 and the image plane 270 and has no influence on the focal length of the optical lens assembly. A filter which allows light in the light wavelength range of 940 nm±30 nm to pass therethrough, is selected in the present embodiment, but not limited thereto.

The detailed optical data of the second embodiment is shown in Table 3, and the aspheric surface data is shown in Table 4.

TABLE 3

Embodiment 2
f = 1.82 mm, Fno = 1.26, FOV = 120.1 deg.

| Surface | | Curvature Radius | | Thickness/gap | Material | Index (nd) | Abbe # (vd) | Focal length |
|---|---|---|---|---|---|---|---|---|
| 0 | Object | Infinity | | 1500 | | | | |
| 1 | Lens 1 | 3.630 | (ASP) | 0.698 | Plastic | 1.643 | 22.5 | −7.19 |
| 2 | | 1.854 | (ASP) | 2.608 | | | | |
| 3 | Lens 2 | −2.449 | (ASP) | 1.114 | Plastic | 1.643 | 22.5 | 8.66 |
| 4 | | −1.976 | (ASP) | 0.938 | | | | |
| 5 | Stop | Infinity | | −0.317 | | | | |
| 6 | Lens 3 | 2.830 | (ASP) | 2.033 | Plastic | 1.643 | 22.5 | 3.16 |
| 7 | | −4.633 | (ASP) | 0.446 | | | | |
| 8 | Lens 4 | −1.503 | (ASP) | 0.327 | Plastic | 1.643 | 22.5 | 15.18 |
| 9 | | −1.404 | (ASP) | 0.033 | | | | |
| 10 | Lens 5 | 3.309 | (ASP) | 0.727 | Plastic | 1.643 | 22.5 | −12.57 |
| 11 | | 2.128 | (ASP) | 0.540 | | | | |
| 12 | IR band-pass filter | Infinity | | 0.300 | Glass | 1.517 | 64.2 | |
| 13 | | Infinity | | 0.172 | | | | |
| 14 | Image plane | Infinity | | — | | | | |

Note:
the reference wavelength is 940 nm

TABLE 4

Aspheric Coefficients

| Surface | 1 | 2 | 3 | 4 | 6 |
|---|---|---|---|---|---|
| K: | −1.4750E+00 | −6.4380E−01 | −1.9172E+00 | −4.7600E+00 | −1.2164E+01 |
| A2: | 0.0000E+00 | 0.0000E+00 | 0.0000E+00 | 0.0000E+00 | 0.0000E+00 |
| A4: | −3.0216E−03 | −2.4478E−03 | 1.6923E−02 | 3.3425E−03 | 1.3629E−01 |
| A6: | −1.6256E−04 | 3.0428E−04 | 1.1651E−05 | 1.7504E−03 | −1.1168E−01 |
| A8: | 4.8716E−06 | −2.2121E−04 | −3.6824E−04 | −1.5620E−04 | −1.7710E−01 |
| A10: | 3.8567E−07 | 2.5279E−05 | 9.4492E−06 | −8.6460E−05 | −1.7710E−01 |
| A12: | 9.7174E−09 | 4.8981E−06 | 5.7232E−06 | 1.4256E−06 | 1.4006E−01 |
| A14: | −1.8769E−10 | −6.0164E−07 | −1.0850E−06 | 2.3209E−06 | −5.9496E−02 |
| A16: | −1.5481E−11 | −9.4170E−08 | −1.4376E−07 | −2.8812E−07 | 1.0189E−02 |
| A18: | −6.3922E−16 | −4.9276E−14 | 1.4800E−11 | −8.7580E−12 | −1.4411E−08 |
| A20: | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| K: | −9.9757E+01 | −8.7285E+00 | −3.8526E+00 | −7.6872E+01 | −1.4973E+01 |
| A2: | 0.0000E+00 | 0.0000E+00 | 0.0000E+00 | 0.0000E+00 | 0.0000E+00 |
| A4: | −8.5069E−02 | −1.3397E−01 | −2.9527E−02 | −2.7183E−02 | −4.1633E−02 |
| A6: | 8.9457E−02 | 2.1133E−01 | 1.2912E−01 | 1.2983E−02 | 6.7235E−03 |
| A8: | −7.8384E−02 | −1.7095E−01 | −1.4405E−02 | 3.6313E−03 | −6.8190E−04 |
| A10: | 1.2846E−02 | 7.0364E−02 | −1.4708E−02 | −1.1279E−03 | −3.7476E−04 |
| A12: | 1.1714E−02 | −3.1808E−02 | −1.1193E−02 | −1.3764E−03 | 5.1745E−05 |
| A14: | −5.2020E−03 | 4.5750E−03 | 5.0309E−03 | 5.7380E−04 | −2.3151E−05 |
| A16: | 5.4978E−04 | 9.6101E−04 | −1.5510E−03 | −6.0815E−05 | 4.1659E−06 |
| A18: | −2.1972E−07 | −4.2701E−07 | 2.6545E−09 | 1.7909E−09 | 6.1000E−11 |
| A20: | 0.0000E+00 | 0.0000E+00 | 0.0000E+00 | 0.0000E+00 | 0.0000E+00 |

In the second embodiment, the equation of the aspheric surface profiles of the aforementioned lenses is the same as the equation of the first embodiment.

Moreover, the definitions of parameters with corresponding values shown in the following table for the second embodiment are the same as those stated in the first embodiment, so an explanation in this regard will not be provided again. These parameters can be calculated as the following values from Table 3 and Table 4 and satisfy the following conditions:

| Embodiment 2 | |
|---|---|
| f[mm] | 1.82 |
| EPD[mm] | 1.45 |
| Fno | 1.26 |
| FOV[deg.] | 120.1 |
| IMH[mm] | 2.00 |
| FOV/(Fno*100) | 0.96 |
| (TL − BFL)/EPD | 5.95 |
| f/f1 | −0.25 |
| f/f3 | 0.57 |
| f5/f1 | 1.75 |
| f3*f5/(f2*f4) | −0.30 |
| f3*T23 | 1.96 |
| CT4/TDP7 | 1.08 |
| BFL/CT5 | 1.39 |
| CT2/CT1 | 1.60 |
| (CT1 + CT2)/(CT3 + CT4 + CT5) | 0.59 |
| TDP2/EPD | 1.18 |
| (vd1*nd1)/vd2 | 1.64 |
| R2/nd1 | 1.13 |
| TL/IMH | 4.81 |

Third Embodiment

Figure 3A:
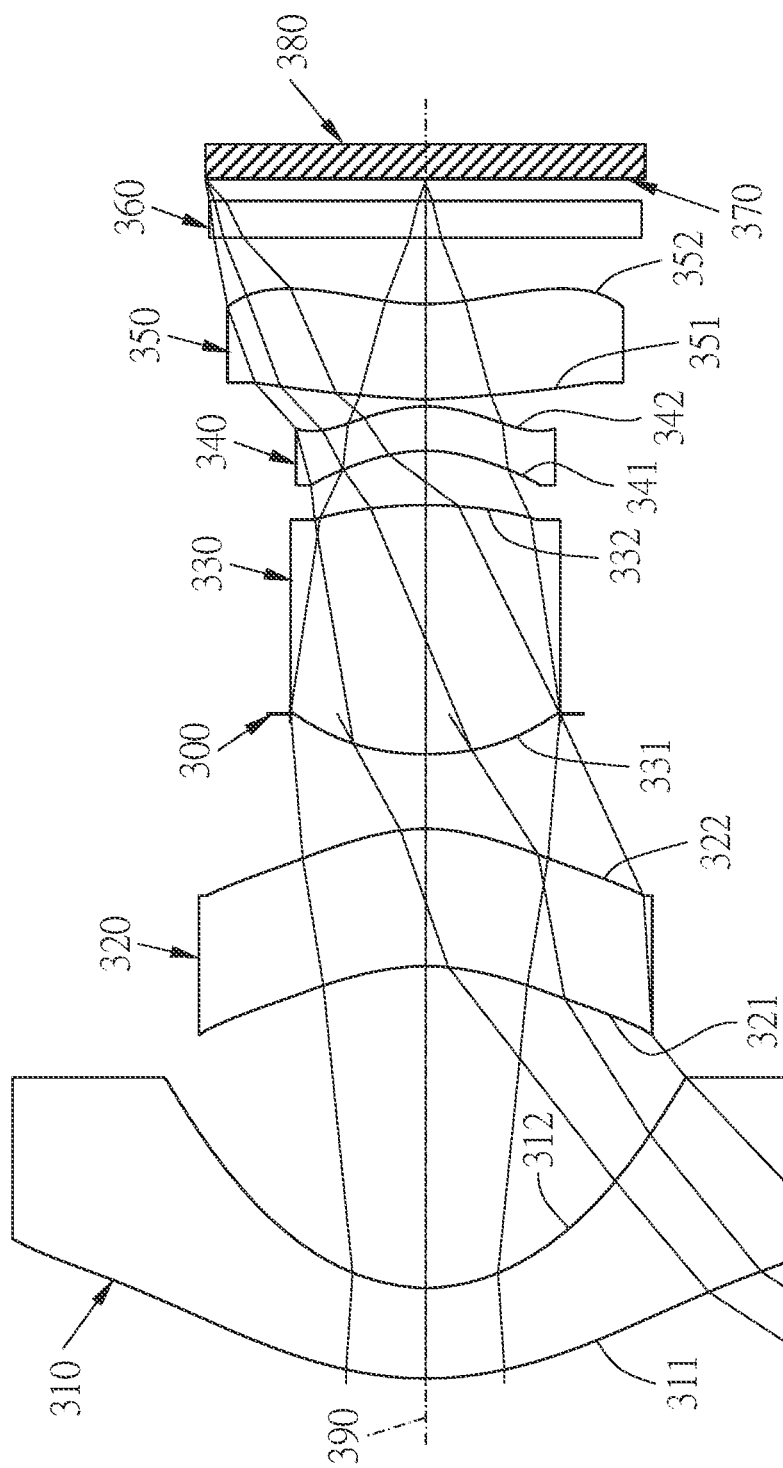
FIG. 3A shows an optical lens assembly in accordance with a third embodiment of the present invention.
Figure 3B:
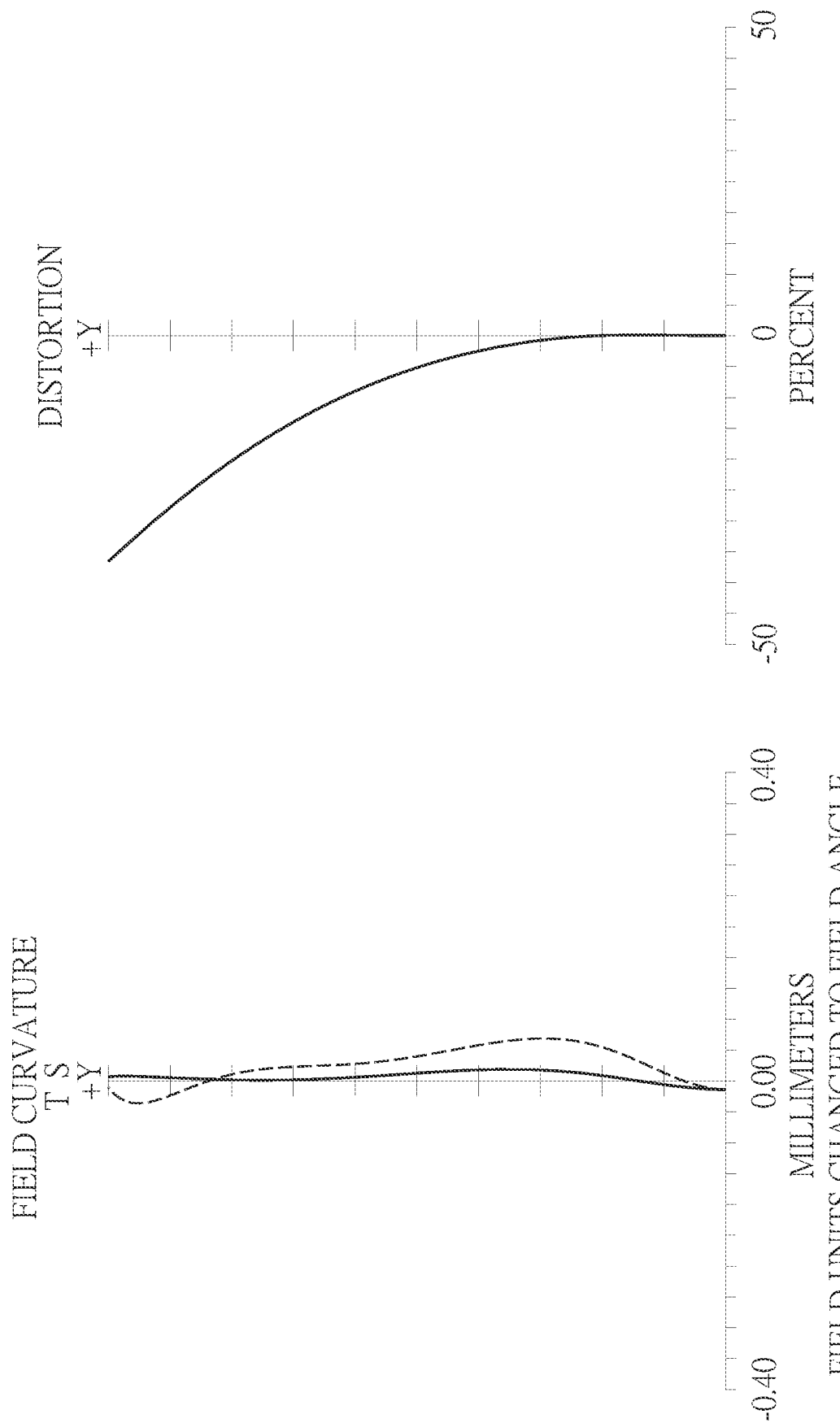
FIG. 3B shows the field curvature curve and the distortion curve of the optical lens assembly in the third embodiment of the present invention in order from left to right.

Referring to FIGS. 3A and 3B, FIG. 3A shows an optical lens assembly in accordance with a third embodiment of the present invention, and FIG. 3B shows, in order from left to right, the field curvature curve and the distortion curve of the third embodiment of the present invention. An optical lens assembly in accordance with the third embodiment of the present invention includes, in order from an object side to an image side along an optical axis 390: a first lens 310, a second lens 320, a stop 300, a third lens 330, a fourth lens 340, a fifth lens 350, an IR band-pass filter 360, and an image plane 370. The optical lens assembly has a total of five lenses with refractive power, for example, but the present invention is not limited thereto. The optical lens assembly works in cooperation with an image sensor 380. The image sensor 380 is disposed on the image plane 370.

The first lens 310 with negative refractive power includes an object-side surface 311 and an image-side surface 312, the object-side surface 311 of the first lens 310 is convex in a paraxial region thereof, the image-side surface 312 of the first lens 310 is concave in a paraxial region thereof, the object-side surface 311 and the image-side surface 312 of the first lens 310 are aspheric, and the first lens 310 is made of plastic material.

The second lens 320 with positive refractive power includes an object-side surface 321 and an image-side surface 322, the object-side surface 321 of the second lens 320 is concave in a paraxial region thereof, the image-side surface 322 of the second lens 320 is convex in a paraxial region thereof, the object-side surface 321 and the image-side surface 322 of the second lens 320 are aspheric, and the second lens 320 is made of plastic material.

The third lens 330 with positive refractive power includes an object-side surface 331 and an image-side surface 332, the object-side surface 331 of the third lens 330 is convex in a paraxial region thereof, the image-side surface 332 of the third lens 330 is convex in a paraxial region thereof, the object-side surface 331 and the image-side surface 332 of the third lens 330 are aspheric, and the third lens 330 is made of plastic material.

The fourth lens 340 with positive refractive power includes an object-side surface 341 and an image-side surface 342, the object-side surface 341 of the fourth lens 340 is concave in a paraxial region thereof, the image-side surface 342 of the fourth lens 340 is convex in a paraxial region thereof, the object-side surface 341 and the image-side surface 342 of the fourth lens 340 are aspheric, and the fourth lens 340 is made of plastic material.

The fifth lens 350 with negative refractive power includes an object-side surface 351 and an image-side surface 352, the object-side surface 351 of the fifth lens 350 is convex in a paraxial region thereof, the image-side surface 352 of the fifth lens 350 is concave in a paraxial region thereof, the object-side surface 351 and the image-side surface 352 of the fifth lens 350 are aspheric, and the fifth lens 350 is made of plastic material.

The IR band-pass filter 360 made of glass is located between the fifth lens 350 and the image plane 370 and has no influence on the focal length of the optical lens assembly. A filter which allows the light in the light wavelength range of 940 nm±30 nm to pass therethrough, for instance, is selected in the present embodiment, but not limited thereto.

The detailed optical data of the third embodiment is shown in Table 5, and the aspheric surface data is shown in Table 6.

TABLE 5

Embodiment 3
f = 1.82 mm, Fno = 1.26, FOV = 119.8 deg.

| Surface | | Curvature Radius | | Thickness/gap | Material | Index (nd) | Abbe # (vd) | Focal length |
|---|---|---|---|---|---|---|---|---|
| 0 | Object | Infinity | | 1500 | | | | |
| 1 | Lens 1 | 3.609 | (ASP) | 0.739 | Plastic | 1.661 | 20.4 | −6.93 |
| 2 | | 1.826 | (ASP) | 2.617 | | | | |
| 3 | Lens 2 | −2.447 | (ASP) | 1.120 | Plastic | 1.643 | 22.5 | 8.49 |
| 4 | | −1.964 | (ASP) | 0.932 | | | | |
| 5 | Stop | Infinity | | −0.328 | | | | |
| 6 | Lens 3 | 2.922 | (ASP) | 2.030 | Plastic | 1.643 | 22.5 | 3.18 |
| 7 | | −4.470 | (ASP) | 0.439 | | | | |
| 8 | Lens 4 | −1.574 | (ASP) | 0.360 | Plastic | 1.643 | 22.5 | 19.87 |
| 9 | | −1.518 | (ASP) | 0.058 | | | | |

TABLE 5-continued

Embodiment 3
f = 1.82 mm, Fno = 1.26, FOV = 119.8 deg.

| Surface | | Curvature Radius | | Thickness/gap | Material | Index (nd) | Abbe # (vd) | Focal length |
|---|---|---|---|---|---|---|---|---|
| 10 | Lens 5 | 3.452 | (ASP) | 0.777 | Plastic | 1.643 | 22.5 | −16.31 |
| 11 | | 2.352 | (ASP) | 0.540 | | | | |
| 12 | IR band-pass filter | Infinity | | 0.300 | Glass | 1.517 | 64.2 | |
| 13 | | Infinity | | 0.168 | | | | |
| 14 | Image plane | Infinity | | — | | | | |

Note:
the reference wavelength is 940 nm

TABLE 6

| Aspheric Coefficients | | | | | |
|---|---|---|---|---|---|
| Surface | 1 | 2 | 3 | 4 | 6 |
| K: | −1.4880E+00 | −6.5932E−01 | −2.0445E+00 | −5.1634E+00 | −1.1959E+01 |
| A2: | 0.0000E+00 | 0.0000E+00 | 0.0000E+00 | 0.0000E+00 | 0.0000E+00 |
| A4: | −3.1537E−03 | −3.4936E−03 | 1.8335E−02 | 3.9088E−03 | 1.3738E−01 |
| A6: | −1.4815E−04 | 4.7450E−04 | 7.5565E−05 | 2.2026E−03 | −1.1109E−01 |
| A8: | 4.7284E−06 | −2.4727E−04 | −3.9815E−06 | −1.3175E−04 | −1.7726E−01 |
| A10: | 4.0592E−07 | 2.3544E−05 | −3.6559E−06 | −1.2503E−04 | −1.7726E−01 |
| A12: | 8.1542E−09 | 5.0063E−06 | 4.9348E−06 | −7.5126E−06 | 1.4086E−01 |
| A14: | −2.5632E−10 | −5.3917E−07 | −1.3166E−06 | 1.8895E−06 | −5.9535E−02 |
| A16: | −1.2991E−11 | −7.6717E−08 | −1.4490E−08 | 2.1953E−07 | 1.0112E−02 |
| A18: | −7.7269E−15 | 3.8608E−10 | −1.9929E−09 | 1.4330E−07 | 2.1506E−05 |
| A20: | −6.5477E−15 | −3.5727E−10 | −2.1639E−09 | −2.8674E−08 | −1.8136E−05 |
| Surface | 7 | 8 | 9 | 10 | 11 |
| K: | −9.9313E+01 | −9.5592E+00 | −4.1031E+00 | −7.6417E+01 | −1.4714E+01 |
| A2: | 0.0000E+00 | 0.0000E+00 | 0.0000E+00 | 0.0000E+00 | 0.0000E+00 |
| A4: | −8.4079E−02 | −1.3690E−01 | −3.5286E−02 | −2.4351E−02 | −4.2141E−02 |
| A6: | 9.1472E−02 | 2.1390E−01 | 1.2363E−01 | 1.2758E−02 | 7.5410E−03 |
| A8: | −7.7843E−02 | −1.6993E−01 | −1.4472E−02 | 3.4684E−03 | −6.2143E−04 |
| A10: | 1.2648E−02 | 6.0136E−02 | −1.5060E−02 | −1.2110E−03 | −4.1845E−04 |
| A12: | 1.1869E−02 | −2.4295E−02 | −7.0768E−03 | −1.3720E−03 | 7.3709E−05 |
| A14: | −5.6431E−03 | 5.3847E−03 | 5.0140E−03 | 6.0010E−04 | −2.6606E−05 |
| A16: | 5.6975E−04 | 1.2930E−04 | −1.3040E−03 | −6.6385E−05 | 3.6764E−06 |
| A18: | 1.2614E−05 | −4.5570E−04 | 4.9272E−06 | 4.1681E−07 | 5.0091E−08 |
| A20: | 1.8970E−05 | 4.1481E−04 | 8.3673E−06 | −3.5160E−08 | 3.2721E−08 |

In the third embodiment, the equation of the aspheric surface profiles of the aforementioned lenses is the same as the equation of the first embodiment.

Moreover, the definitions of parameters with corresponding values shown in the following table for the third embodiment are the same as those stated in the first embodiment, so an explanation in this regard will not be provided again. These parameters in the following table can be calculated as the following values from Table 5 and Table 6 and satisfy the following conditions:

| Embodiment 3 | |
|---|---|
| f[mm] | 1.82 |
| EPD[mm] | 1.45 |
| Fno | 1.26 |
| FOV[deg.] | 119.8 |
| IMH[mm] | 2.00 |
| FOV/(Fno*100) | 0.95 |
| (TL − BFL)/EPD | 6.04 |
| f/f1 | −0.26 |
| f/f3 | 0.57 |
| f5/f1 | 2.35 |
| f3*f5/(f2*f4) | −0.31 |
| f3*T23 | 1.92 |
| CT4/TDP7 | 1.28 |
| BFL/CT5 | 1.30 |
| CT2/CT1 | 1.52 |
| (CT1 + CT2)/(CT3 + CT4 + CT5) | 0.59 |
| TDP2/EPD | 1.18 |
| (vd1*nd1)/vd2 | 1.51 |
| R2/nd1 | 1.10 |
| TL/IMH | 4.88 |

Fourth Embodiment

Figure 4A:
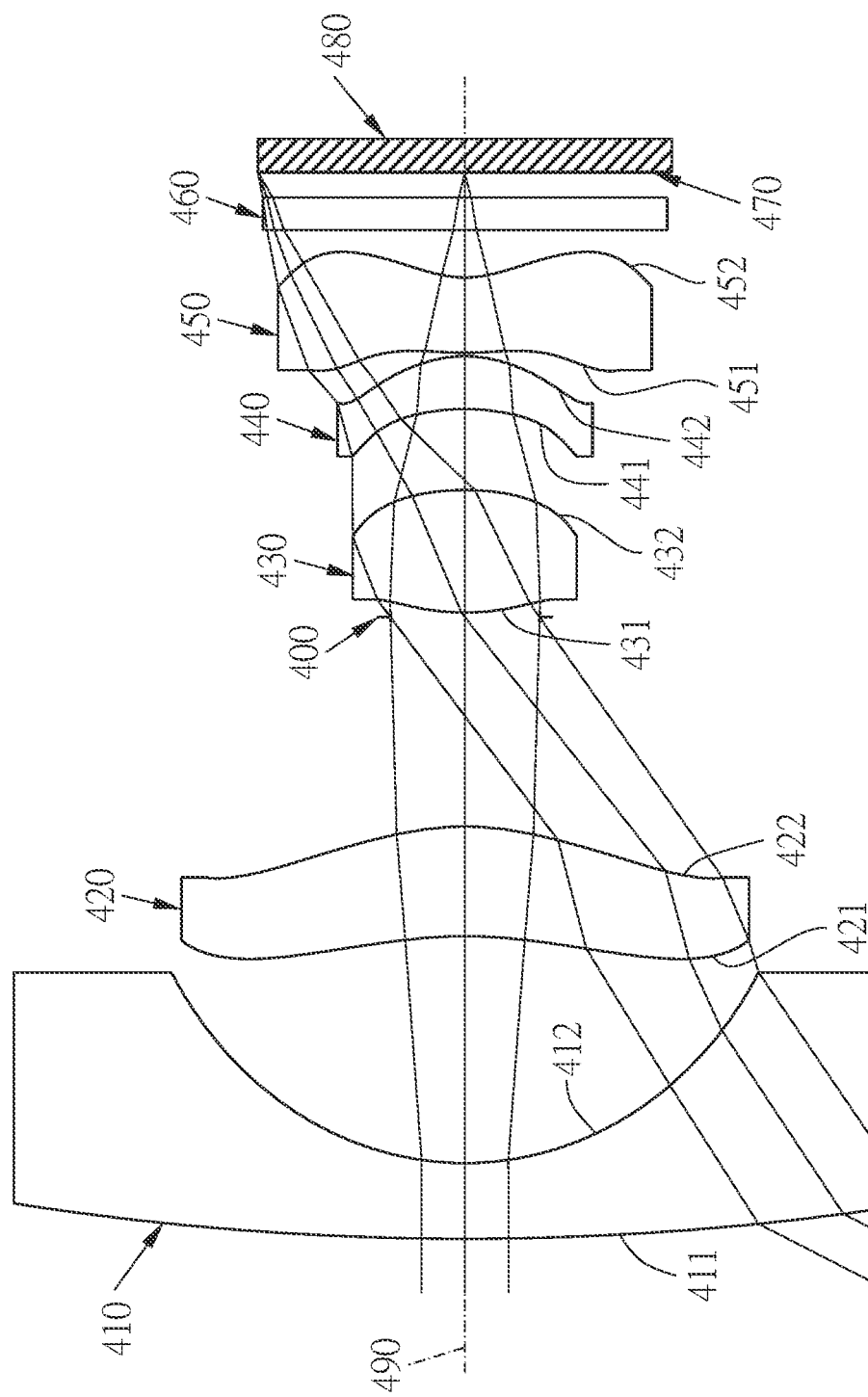
FIG. 4A shows an optical lens assembly in accordance with a fourth embodiment of the present invention.
Figure 4B:
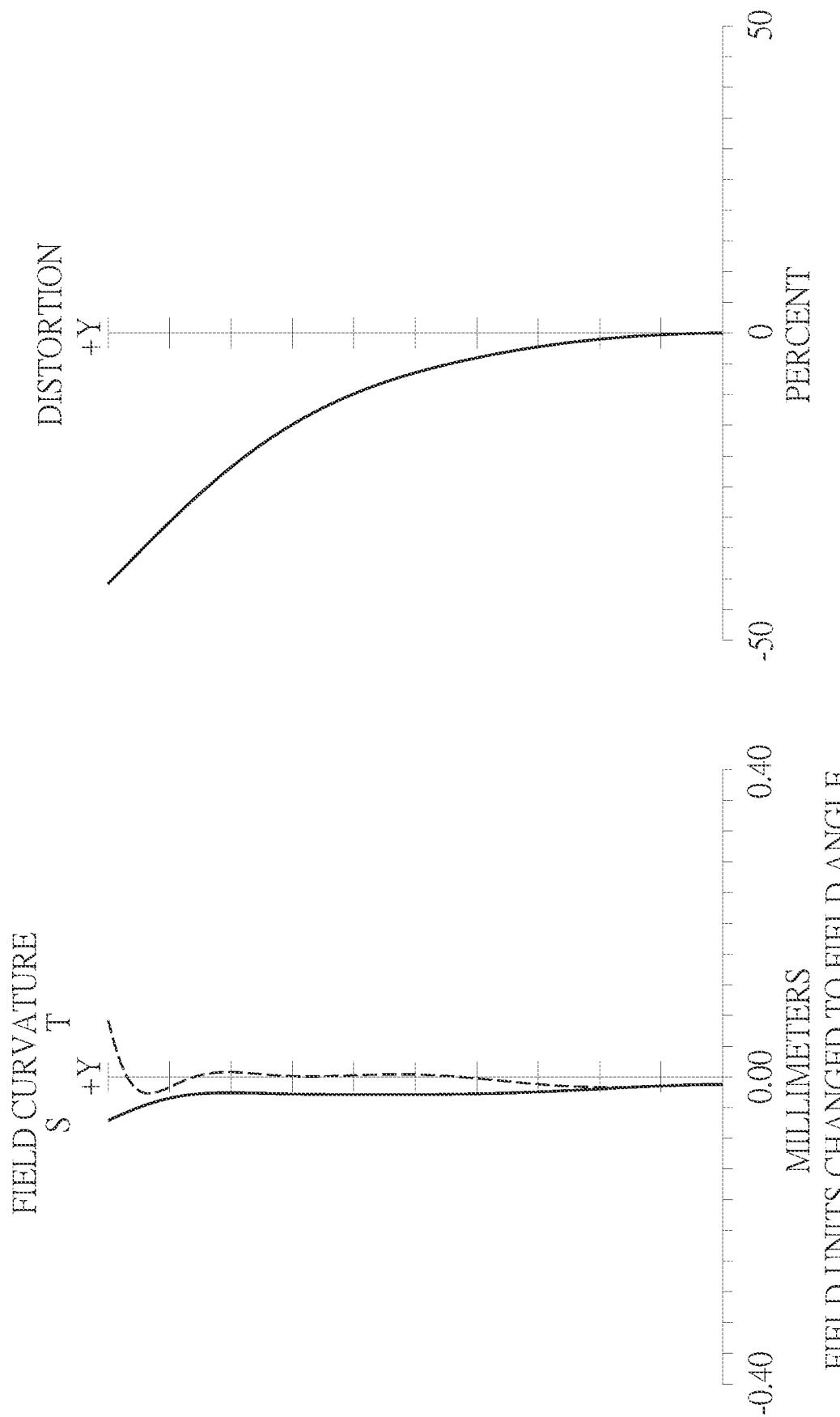
FIG. 4B shows the field curvature curve and the distortion curve of the optical lens assembly in the fourth embodiment of the present invention in order from left to right.

Referring to FIGS. 4A and 4B, FIG. 4A shows an optical lens assembly in accordance with a fourth embodiment of the present invention, and FIG. 4B shows, in order from left to right, the field curvature curve and the distortion curve of the fourth embodiment of the present invention. An optical lens assembly in accordance with the fourth embodiment of the present invention includes, in order from an object side to an image side along an optical axis 490: a first lens 410, a second lens 420, a stop 400, a third lens 430, a fourth lens 440, a fifth lens 450, an IR band-pass filter 460, and an image plane 470. The optical lens assembly has a total of five lenses with refractive power, for example, but the present invention is not limited thereto. The optical lens assembly works in cooperation with an image sensor 480. The image sensor 480 is disposed on the image plane 470.

The first lens 410 with negative refractive power includes an object-side surface 411 and an image-side surface 412, the object-side surface 411 of the first lens 410 is convex in a paraxial region thereof, the image-side surface 412 of the first lens 410 is concave in a paraxial region thereof, and the first lens 410 is made of glass material.

The second lens 420 with positive refractive power includes an object-side surface 421 and an image-side surface 422, the object-side surface 421 of the second lens 420 is concave in a paraxial region thereof, the image-side surface 422 of the second lens 420 is convex in a paraxial region thereof, the object-side surface 421 and the image-side surface 422 of the second lens 420 are aspheric, and the second lens 420 is made of plastic material.

The third lens 430 with positive refractive power includes an object-side surface 431 and an image-side surface 432, the object-side surface 431 of the third lens 430 is convex in a paraxial region thereof, the image-side surface 432 of the third lens 430 is convex in a paraxial region thereof, the object-side surface 431 and the image-side surface 432 of the third lens 430 are aspheric, and the third lens 430 is made of plastic material.

The fourth lens 440 with positive refractive power includes an object-side surface 441 and an image-side surface 442, the object-side surface 441 of the fourth lens 440 is concave in a paraxial region thereof, the image-side surface 442 of the fourth lens 440 is convex in a paraxial region thereof, the object-side surface 441 and the image-side surface 442 of the fourth lens 440 are aspheric, and the fourth lens 440 is made of plastic material.

The fifth lens 450 with negative refractive power includes an object-side surface 451 and an image-side surface 452, the object-side surface 451 of the fifth lens 450 is convex in a paraxial region thereof, the image-side surface 452 of the fifth lens 450 is concave in a paraxial region thereof, the object-side surface 451 and the image-side surface 452 of the fifth lens 450 are aspheric, and the fifth lens 450 is made of plastic material.

The IR band-pass filter 460 made of glass is located between the fifth lens 450 and the image plane 470 and has no influence on the focal length of the optical lens assembly. A filter which allows the light in the light wavelength range of 940 nm±30 nm to pass therethrough, is selected in the present embodiment, but not limited thereto.

The detailed optical data of the fourth embodiment is shown in Table 7, and the aspheric surface data is shown in Table 8.

TABLE 7

Embodiment 4
f = 1.65 mm, Fno = 1.82, FOV = 130.9 deg.

| Surface | | Curvature Radius | | Thickness/gap | Material | Index (nd) | Abbe # (vd) | Focal length |
|---|---|---|---|---|---|---|---|---|
| 0 | Object | Infinity | | 1500 | | | | |
| 1 | Lens 1 | 33.553 | | 0.699 | Glass | 1.729 | 54.7 | −5.54 |
| 2 | | 3.518 | | 2.108 | | | | |
| 3 | Lens 2 | −5.211 | (ASP) | 1.013 | Plastic | 1.661 | 20.4 | 11.68 |
| 4 | | −3.290 | (ASP) | 1.944 | | | | |
| 5 | Stop | infinity | | 0.041 | | | | |
| 6 | Lens 3 | 2.606 | (ASP) | 1.138 | Plastic | 1.544 | 56.0 | 2.73 |
| 7 | | −2.810 | (ASP) | 0.752 | | | | |
| 8 | Lens 4 | −2.307 | (ASP) | 0.487 | Plastic | 1.661 | 20.4 | 4.64 |
| 9 | | −1.400 | (ASP) | 0.035 | | | | |
| 10 | Lens 5 | 3.879 | (ASP) | 0.697 | Plastic | 1.544 | 56.0 | −3.46 |
| 11 | | 1.176 | (ASP) | 0.439 | | | | |
| 12 | IR band-pass filter | Infinity | | 0.300 | Glass | 1.517 | 64.2 | |
| 13 | | Infinity | | 0.227 | | | | |
| 14 | Image plane | Infinity | | — | | | | |

Note:
the reference wavelength is 940 nm

TABLE 8

Aspheric Coefficients

| surface | 3 | 4 | 6 | 7 |
|---|---|---|---|---|
| K: | −1.1469E+01 | −6.8486E+00 | −2.4962E+01 | −2.3913E+01 |
| A2: | 0.0000E+00 | 0.0000E+00 | 0.0000E+00 | 0.0000E+00 |
| A4: | 8.5686E−03 | 4.2855E−03 | 1.3356E−01 | −1.5405E−01 |
| A6: | −1.1645E−03 | −8.1663E−04 | −1.8659E−01 | 1.0417E−01 |
| A8: | 9.5395E−05 | 1.2031E−04 | −3.3320E−02 | −1.2630E−01 |
| A10: | 1.0456E−05 | 2.2420E−06 | −3.3320E−02 | 3.0397E−02 |
| A12: | −1.5344E−06 | −4.4746E−07 | 1.6973E−01 | 4.0459E−02 |
| A14: | 2.2959E−08 | −8.6082E−08 | −3.3851E−01 | −3.8974E−02 |
| A16: | 3.9732E−09 | 1.0338E−08 | 1.5660E−01 | 8.9723E−03 |

TABLE 8-continued

| Aspheric Coefficients | | | | |
|---|---|---|---|---|
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| surface | 8 | 9 | 10 | 11 |
|---|---|---|---|---|
| K: | −2.7971E+01 | −6.0020E+00 | −2.8753E+01 | −5.4332E+00 |
| A2: | 0.0000E+00 | 0.0000E+00 | 0.0000E+00 | 0.0000E+00 |
| A4: | −1.3549E−01 | −1.0755E−01 | −2.0809E−01 | −1.0019E−01 |
| A6: | 6.4099E−02 | 4.8921E−02 | 7.3783E−02 | 4.7581E−02 |
| A8: | −1.5727E−01 | −2.9122E−02 | −4.7878E−03 | −1.8148E−02 |
| A10: | 7.4930E−02 | −6.9690E−03 | −1.4548E−03 | 2.2939E−03 |
| A12: | 7.9739E−04 | 1.2662E−02 | 3.1484E−04 | 4.9276E−04 |
| A14: | −1.0195E−02 | 9.2466E−03 | 3.4816E−04 | −2.3740E−04 |
| A16: | 6.5157E−03 | −4.9242E−03 | −1.1316E−04 | 2.8678E−05 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

In the fourth embodiment, the equation of the aspheric surface profiles of the aforementioned lenses is the same as the equation of the first embodiment.

Moreover, the definitions of parameters with corresponding values shown in the following table for the fourth embodiment are the same as those stated in the first embodiment, so an explanation in this regard will not be provided again. These parameters in the following table can be calculated as the following values from Table 7 and Table 8 and satisfy the following conditions:

| Embodiment 4 | |
|---|---|
| f[mm] | 1.65 |
| EPD[mm] | 0.91 |
| Fno | 1.82 |
| FOV[deg.] | 130.9 |
| IMH[mm] | 2.15 |
| FOV/(Fno*100) | 0.72 |
| (TL − BFL)/EPD | 9.80 |
| f/f1 | −0.30 |
| f/f3 | 0.61 |
| f5/f1 | 0.62 |
| f3*f5/(f2*f4) | −0.17 |
| f3*T23 | 5.41 |
| CT4/TDP7 | 1.09 |
| BFL/CT5 | 1.38 |
| CT2/CT1 | 1.45 |
| (CT1 + CT2)/(CT3 + CT4 + CT5) | 0.74 |
| TDP2/EPD | 1.94 |
| (vd1*nd1)/vd2 | 4.64 |
| R2/nd1 | 2.03 |
| TL/IMH | 4.60 |

Fifth Embodiment

Figure 5A:
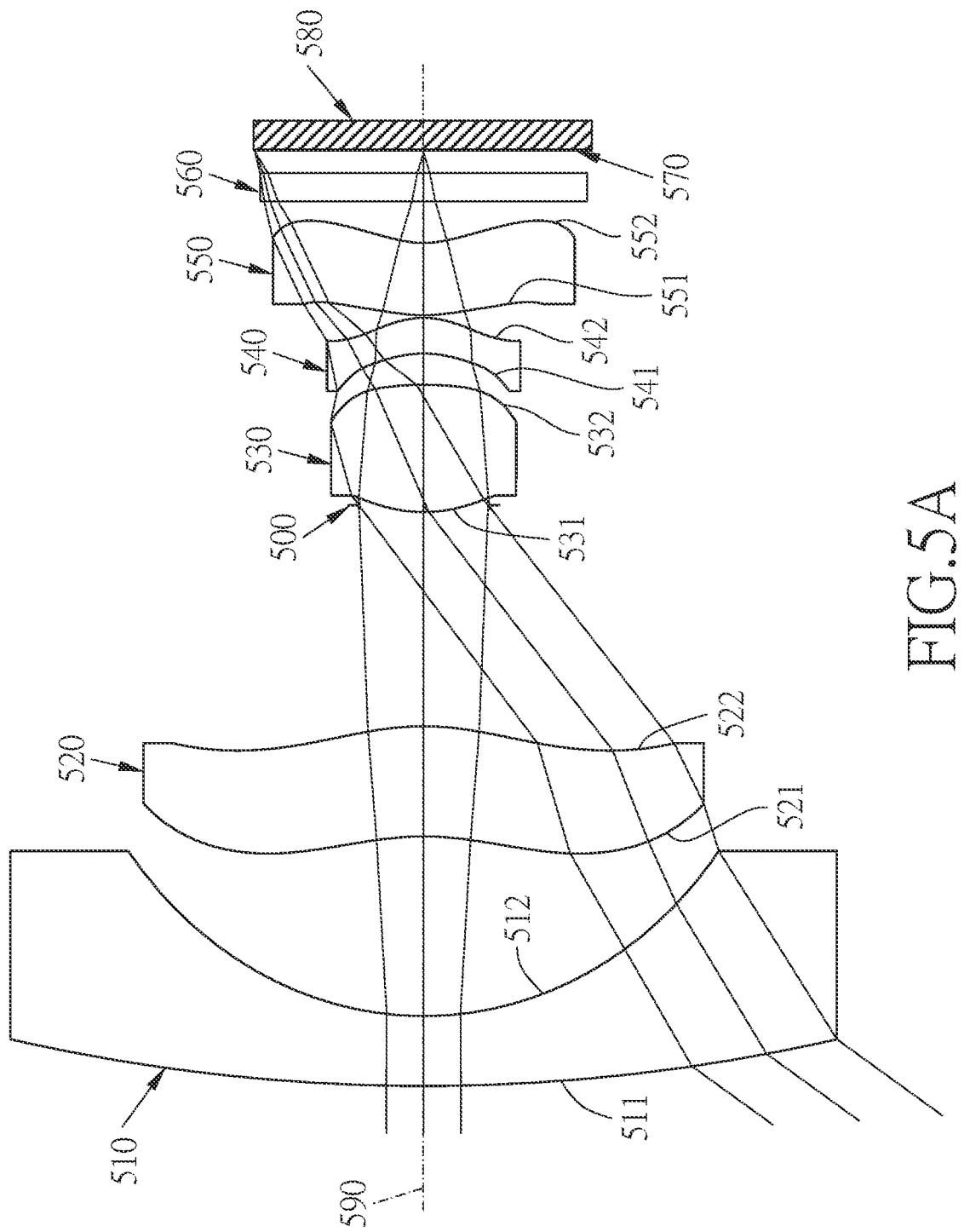
FIG. 5A shows an optical lens assembly in accordance with a fifth embodiment of the present invention.
Figure 5B:
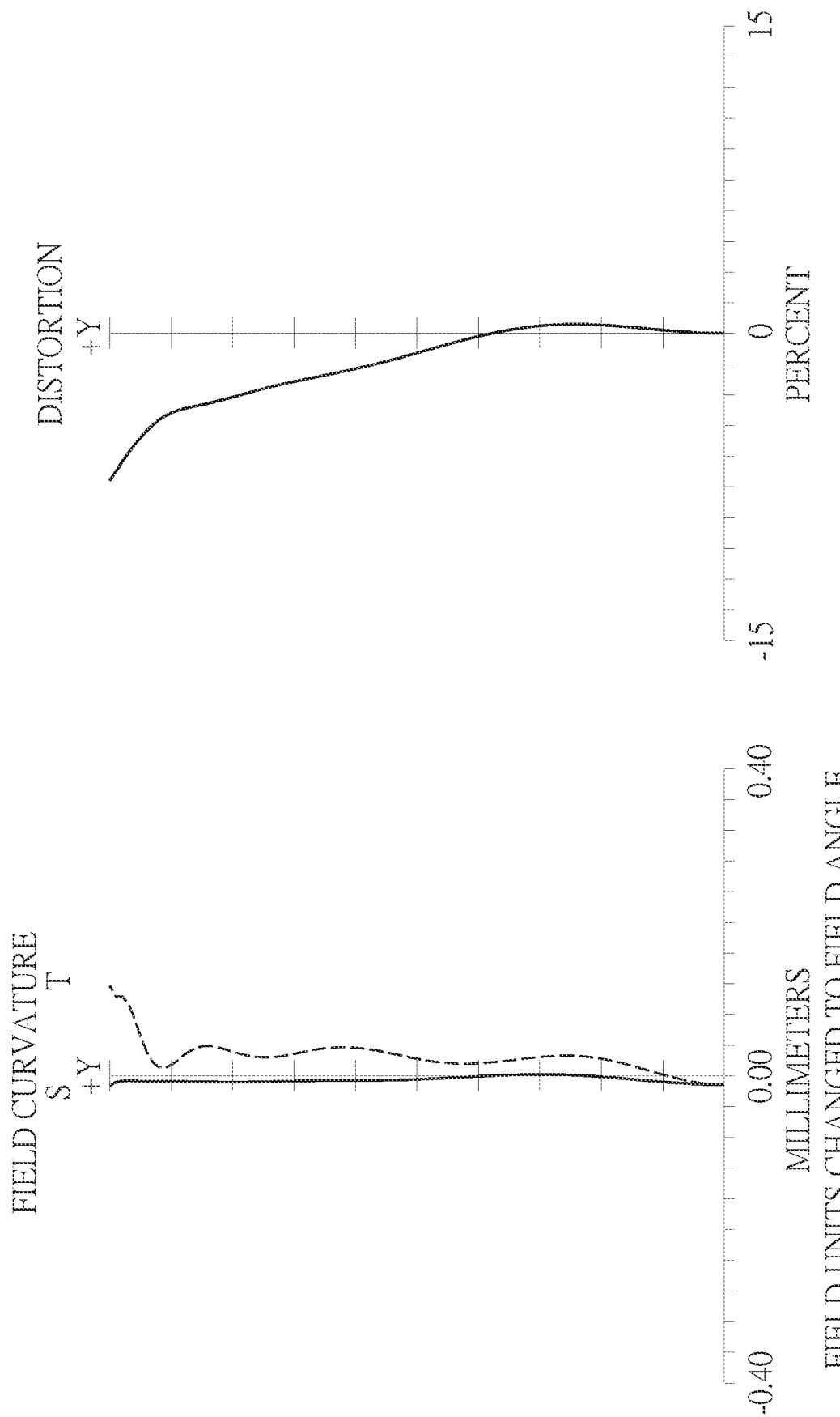
FIG. 5B shows the field curvature curve and the distortion curve of the optical lens assembly in the fifth embodiment of the present invention in order from left to right.

Referring to FIGS. 5A and 5B, FIG. 5A shows an optical lens assembly in accordance with a fifth embodiment of the present invention, and FIG. 5B shows, in order from left to right, the field curvature curve and the distortion curve of the fifth embodiment of the present invention. An optical lens assembly in accordance with the fifth embodiment of the present invention includes, in order from an object side to an image side along an optical axis 590: a first lens 510, a second lens 520, a stop 500, a third lens 530, a fourth lens 540, a fifth lens 550, an IR band-pass filter 560, and an image plane 570. The optical lens assembly has, for example but not limited to, a total of five lenses with refractive power. The optical lens assembly works in cooperation with an image sensor 580. The image sensor 580 is disposed on the image plane 570.

The first lens 510 with negative refractive power includes an object-side surface 511 and an image-side surface 512, the object-side surface 511 of the first lens 510 is convex in a paraxial region thereof, the image-side surface 512 of the first lens 510 is concave in a paraxial region thereof, and the first lens 510 is made of glass material.

The second lens 520 with positive refractive power includes an object-side surface 521 and an image-side surface 522, the object-side surface 521 of the second lens 520 is concave in a paraxial region thereof, the image-side surface 522 of the second lens 520 is convex in a paraxial region thereof, the object-side surface 521 and the image-side surface 522 of the second lens 520 are aspheric, and the second lens 520 is made of plastic material.

The third lens 530 with positive refractive power includes an object-side surface 531 and an image-side surface 532, the object-side surface 531 of the third lens 530 is convex in a paraxial region thereof, the image-side surface 532 of the third lens 530 is convex in a paraxial region thereof, the object-side surface 531 and the image-side surface 532 of the third lens 530 are aspheric, and the third lens 530 is made of plastic material.

The fourth lens 540 with positive refractive power includes an object-side surface 541 and an image-side surface 542, the object-side surface 541 of the fourth lens 540 is concave in a paraxial region thereof, the image-side surface 542 of the fourth lens 540 is convex in a paraxial region thereof, the object-side surface 541 and the image-side surface 542 of the fourth lens 540 are aspheric, and the fourth lens 540 is made of plastic material.

The fifth lens 550 with negative refractive power includes an object-side surface 551 and an image-side surface 552, the object-side surface 551 of the fifth lens 550 is convex in a paraxial region thereof, the image-side surface 552 of the fifth lens 550 is concave in a paraxial region thereof, the object-side surface 551 and the image-side surface 552 of the fifth lens 550 are aspheric, and the fifth lens 550 is made of plastic material.

The IR band-pass filter 560 made of glass is located between the fifth lens 550 and the image plane 570 and has no influence on the focal length of the optical lens assembly. A filter which allows the light in the light wavelength range of 940 nm±30 nm to pass therethrough is selected in the present embodiment, but not limited thereto.

The detailed optical data of the fifth embodiment is shown in Table 9, and the aspheric surface data is shown in Table 10.

TABLE 9

Embodiment 5
f = 1.38 mm, Fno = 1.56, FOV = 114.4 deg.

| surface | | Curvature Radius | | Thickness/gap | Material | Index (nd) | Abbe # (vd) | Focal length |
|---|---|---|---|---|---|---|---|---|
| 0 | Object | Infinity | | 1500 | | | | |
| 1 | Lens 1 | 24.495 | | 0.739 | Glass | 1.804 | 46.5 | −6.89 |
| 2 | | 4.381 | | 1.896 | | | | |
| 3 | Lens 2 | −3.696 | (ASP) | 1.162 | Plastic | 1.661 | 20.4 | 24.19 |
| 4 | | −3.343 | (ASP) | 2.334 | | | | |
| 5 | Stop | Infinity | | −0.074 | | | | |
| 6 | Lens 3 | 1.863 | (ASP) | 1.347 | Plastic | 1.544 | 56.0 | 2.62 |
| 7 | | −4.245 | (ASP) | 0.327 | | | | |
| 8 | Lens 4 | −1.392 | (ASP) | 0.375 | Plastic | 1.661 | 20.4 | 6.75 |
| 9 | | −1.161 | (ASP) | 0.031 | | | | |
| 10 | Lens 5 | 2.004 | (ASP) | 0.763 | Plastic | 1.544 | 56.0 | −13.31 |
| 11 | | 1.357 | (ASP) | 0.439 | | | | |
| 12 | IR band-pass filter | Infinity | | 0.300 | Glass | 1.517 | 64.2 | |
| 13 | | Infinity | | 0.232 | | | | |
| 14 | Image plane | Infinity | | — | | | | |

Note:
the reference wavelength is 940 nm

TABLE 10

Aspheric Coefficients

| Surface | 3 | 4 | 6 | 7 |
|---|---|---|---|---|
| K: | −1.3931E+01 | −5.0357E+00 | −4.5685E+00 | 1.2181E+01 |
| A2: | 0.0000E+00 | 0.0000E+00 | 0.0000E+00 | 0.0000E+00 |
| A4: | 1.1904E−02 | 2.6368E−02 | 8.0081E−02 | 4.4216E−02 |
| A6: | 4.0360E−05 | −7.2310E−03 | −2.1257E−01 | −4.7129E−01 |
| A8: | −3.5538E−04 | 1.9373E−03 | −3.6380E+00 | 1.6188E+00 |
| A10: | 9.8888E−05 | −3.6205E−04 | −3.6380E+00 | −3.7728E+00 |
| A12: | −1.3183E−05 | 4.0350E−05 | 6.6376E+00 | 4.3679E+00 |
| A14: | 8.7671E−07 | −2.3708E−06 | −6.1077E+00 | −2.4350E+00 |
| A16: | −2.2966E−08 | 5.5849E−08 | 2.1450E+00 | 5.3140E−01 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8 | 9 | 10 | 11 |
|---|---|---|---|---|
| K: | −6.9883E+00 | −5.4314E+00 | −5.0973E−01 | −1.0029E+00 |
| A2: | 0.0000E+00 | 0.0000E+00 | 0.0000E+00 | 0.0000E+00 |
| A4: | 6.7274E−02 | −1.4059E−01 | −3.4040E−01 | −3.2725E−01 |
| A6: | −8.5139E−01 | −3.6702E−01 | 2.2895E−01 | 1.9734E−01 |
| A8: | 2.9227E+00 | 2.8509E+00 | 4.6872E−01 | 4.4128E−02 |
| A10: | −4.3463E+00 | −5.2412E+00 | −1.3655E+00 | −2.2757E−01 |
| A12: | 1.8736E+00 | 4.5992E+00 | 1.5731E+00 | 2.1885E−01 |
| A14: | 6.9592E−01 | −2.0212E+00 | −1.0218E+00 | −1.1103E−01 |
| A16: | −4.9872E−01 | 3.6144E−01 | 3.9179E−01 | 3.2315E−02 |
| A18: | 0.0000E+00 | 0.0000E+00 | −8.3603E−02 | −5.1027E−03 |
| A20: | 0.0000E+00 | 0.0000E+00 | 7.7422E−03 | 3.3948E−04 |

In the fifth embodiment, the equation of the aspheric surface profiles of the aforementioned lenses is the same as the equation of the first embodiment.

Moreover, the definitions of parameters with corresponding values shown in the following table for the fifth embodiment are the same as those stated in the first embodiment, so an explanation in this regard will not be provided again.

These parameters in the following table can be calculated as the following values from Table 9 and Table 10 and satisfy the following conditions:

| Embodiment 5 | |
|---|---|
| f[mm] | 1.38 |
| EPD[mm] | 0.89 |
| Fno | 1.56 |
| FOV[deg.] | 114.4 |
| IMH[mm] | 2.00 |
| FOV/(Fno*100) | 0.74 |
| (TL − BFL)/EPD | 10.02 |

-continued

| Embodiment 5 | |
|---|---|
| f/f1 | −0.20 |
| f/f3 | 0.53 |
| f5/f1 | 1.93 |
| f3*f5/(f2*f4) | −0.21 |
| f3*T23 | 5.92 |
| CT4/TDP7 | 0.95 |
| BFL/CT5 | 1.27 |
| CT2/CT1 | 1.57 |
| (CT1 + CT2)/(CT3 + CT4 + CT5) | 0.77 |
| TDP2/EPD | 1.96 |
| (vd1*nd1)/vd2 | 4.12 |
| R2/nd1 | 2.43 |
| TL/IMH | 4.94 |

Sixth Embodiment

Figure 6A:
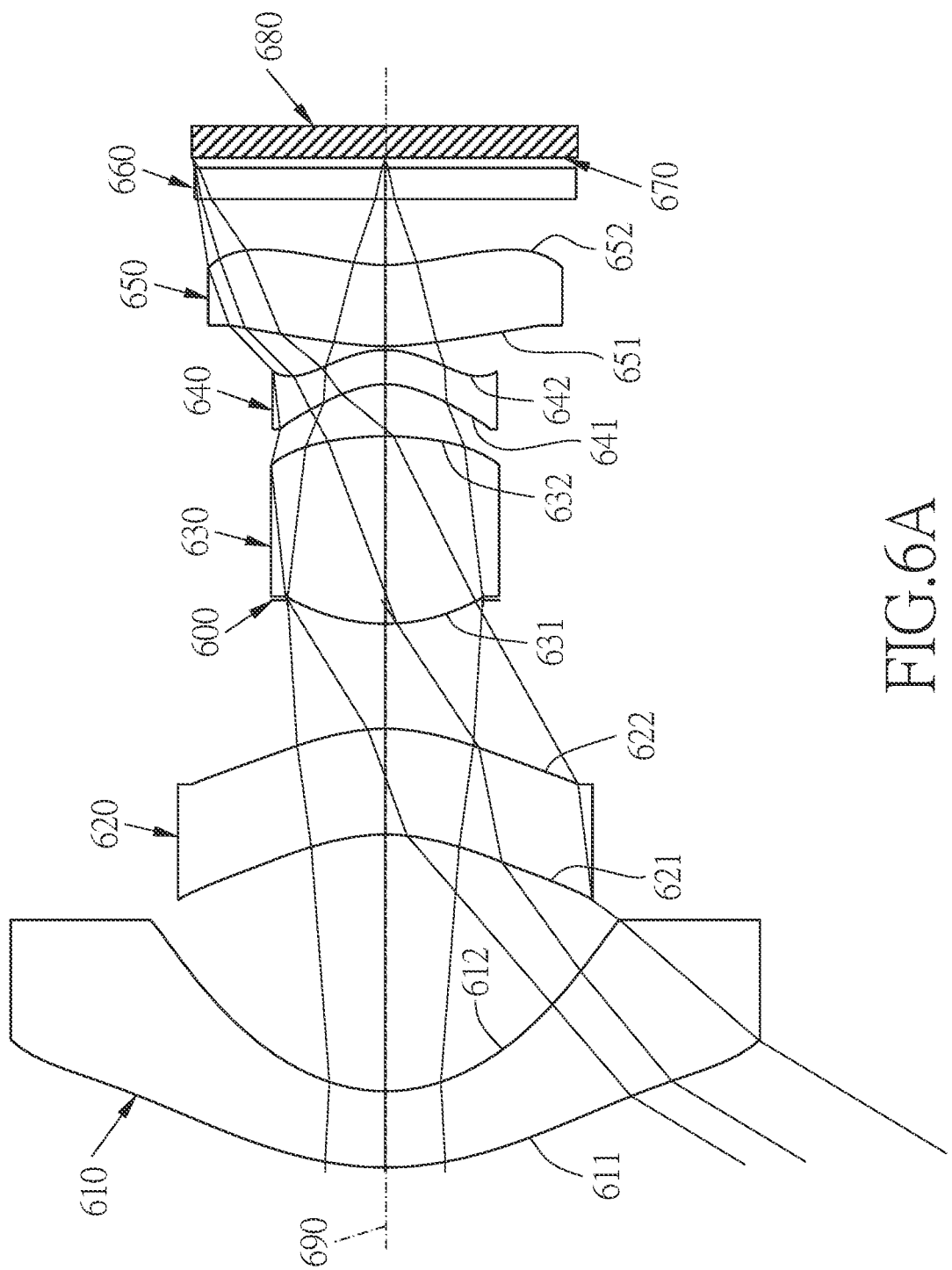
FIG. 6A shows an optical lens assembly in accordance with a sixth embodiment of the present invention.
Figure 6B:
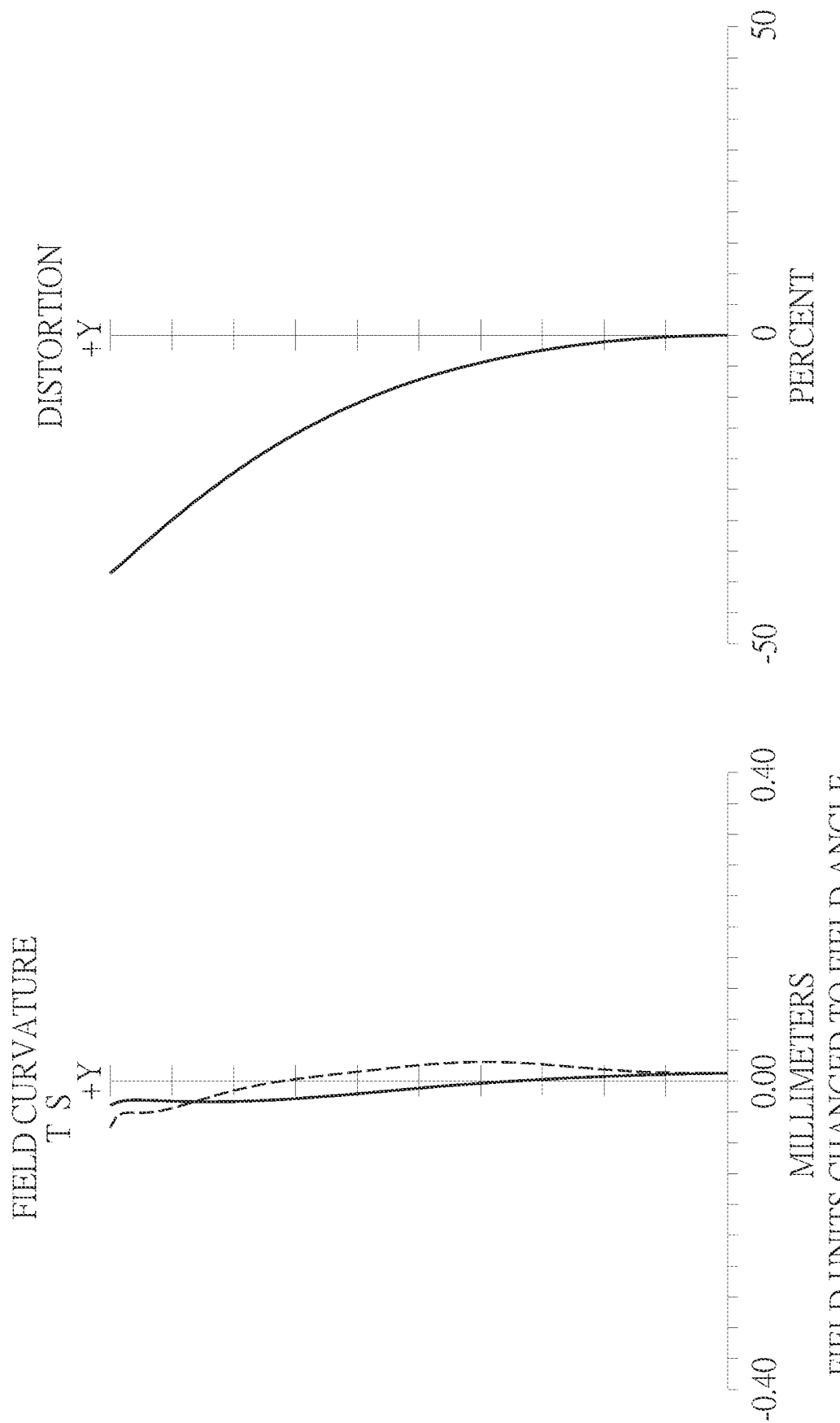
FIG. 6B shows the field curvature curve and the distortion curve of the optical lens assembly in the sixth embodiment of the present invention in order from left to right.

Referring to FIGS. 6A and 6B, FIG. 6A shows an optical lens assembly in accordance with a sixth embodiment of the present invention, and FIG. 6B shows, in order from left to right, the field curvature curve and the distortion curve of the sixth embodiment of the present invention. An optical lens assembly in accordance with the sixth embodiment of the present invention includes, in order from an object side to an image side along an optical axis 690: a first lens 610, a second lens 620, a stop 600, a third lens 630, a fourth lens 640, a fifth lens 650, an IR band-pass filter 660, and an image plane 670. The optical lens assembly has, for example but not limited to, a total of five lenses with refractive power. The optical lens assembly works in cooperation with an image sensor 680. The image sensor 680 is disposed on the image plane 670.

The first lens 610 with negative refractive power includes an object-side surface 611 and an image-side surface 612, the object-side surface 611 of the first lens 610 is convex in a paraxial region thereof, the image-side surface 612 of the first lens 610 is concave in a paraxial region thereof, the object-side surface 611 and the image-side surface 612 of the first lens 610 are aspheric, and the first lens 610 is made of plastic material.

The second lens 620 with positive refractive power includes an object-side surface 621 and an image-side surface 622, the object-side surface 621 of the second lens 620 is concave in a paraxial region thereof, the image-side surface 622 of the second lens 620 is convex in a paraxial region thereof, the object-side surface 621 and the image-side surface 622 of the second lens 620 are aspheric, and the second lens 620 is made of plastic material.

The third lens 630 with positive refractive power includes an object-side surface 631 and an image-side surface 632, the object-side surface 631 of the third lens 630 is convex in a paraxial region thereof, the image-side surface 632 of the third lens 630 is convex in a paraxial region thereof, the object-side surface 631 and the image-side surface 632 of the third lens 630 are aspheric, and the third lens 630 is made of plastic material.

The fourth lens 640 with positive refractive power includes an object-side surface 641 and an image-side surface 642, the object-side surface 641 of the fourth lens 640 is concave in a paraxial region thereof, the image-side surface 642 of the fourth lens 640 is convex in a paraxial region thereof, the object-side surface 641 and the image-side surface 642 of the fourth lens 640 are aspheric, and the fourth lens 640 is made of plastic material.

The fifth lens 650 with negative refractive power includes an object-side surface 651 and an image-side surface 652, the object-side surface 651 of the fifth lens 650 is convex in a paraxial region thereof, the image-side surface 652 of the fifth lens 650 is concave in a paraxial region thereof, the object-side surface 651 and the image-side surface 652 of the fifth lens 650 are aspheric, and the fifth lens 650 is made of plastic material.

The IR band-pass filter 660 made of glass is located between the fifth lens 650 and the image plane 670 and has no influence on the focal length of the optical lens assembly. A filter which allows the light in the light wavelength range of 940 nm±30 nm to pass therethrough, is selected in the present embodiment, but not limited thereto.

The detailed optical data of the sixth embodiment is shown in Table 11, and the aspheric surface data is shown in Table 12.

TABLE 11

Embodiment 6
f = 1.84 mm, Fno = 1.4, FOV = 123.5 deg.

| Surface | | Curvature Radius | | Thickness/gap | Material | Index (nd) | Abbe # (vd) | Focal length |
|---|---|---|---|---|---|---|---|---|
| 0 | Object | Infinity | | 1500 | | | | |
| 1 | Lens 1 | 3.928 | (ASP) | 0.737 | Plastic | 1.643 | 22.5 | −8.07 |
| 2 | | 2.044 | (ASP) | 2.496 | | | | |
| 3 | Lens 2 | −2.525 | (ASP) | 1.030 | Plastic | 1.643 | 22.5 | 20.07 |
| 4 | | −2.428 | (ASP) | 1.248 | | | | |
| 5 | Stop | Infinity | | −0.231 | | | | |
| 6 | Lens 3 | 2.375 | (ASP) | 1.825 | Plastic | 1.643 | 22.5 | 2.69 |
| 7 | | −3.994 | (ASP) | 0.506 | | | | |
| 8 | Lens 4 | −1.071 | (ASP) | 0.331 | Plastic | 1.643 | 22.5 | 20.12 |
| 9 | | −1.103 | (ASP) | 0.035 | | | | |
| 10 | Lens 5 | 3.281 | (ASP) | 0.794 | Plastic | 1.643 | 22.5 | −17.15 |
| 11 | | 2.276 | (ASP) | 0.640 | | | | |
| 12 | IR band-pass filter | Infinity | | 0.300 | Glass | 1.517 | 64.2 | |
| 13 | | Infinity | | 0.091 | | | | |
| 14 | Image plane | Infinity | | — | | | | |

Note:
the reference wavelength is 940 nm

TABLE 12

Aspheric Coefficients

| Surface | 1 | 2 | 3 | 4 | 6 |
|---|---|---|---|---|---|
| K: | −2.0831E+00 | −5.6259E−01 | −1.9598E+00 | −4.1037E+00 | −1.1845E+01 |
| A2: | 0.0000E+00 | 0.0000E+00 | 0.0000E+00 | 0.0000E+00 | 0.0000E+00 |
| A4: | −1.8717E−03 | −4.4287E−03 | 1.5073E−02 | 6.2654E−03 | 1.2229E−01 |
| A6: | −1.2213E−04 | 1.6061E−04 | −1.7475E−04 | 5.7604E−04 | −9.4299E−02 |
| A8: | 2.5561E−06 | −2.1103E−04 | −2.0231E−04 | −3.6000E−06 | −1.6325E−01 |
| A10: | 2.2756E−07 | 2.3878E−05 | 3.0750E−06 | −4.5820E−05 | −1.6325E−01 |
| A12: | 8.0176E−09 | 3.4720E−06 | 2.7416E−06 | 1.7358E−06 | 1.5475E−01 |
| A14: | −1.4558E−10 | −7.9242E−07 | −6.5616E−07 | −6.0917E−08 | −7.5935E−02 |
| A16: | 0.0000E+00 | 0.0000E+00 | 0.0000E+00 | 0.0000E+00 | 1.4215E−02 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| K: | −5.2290E+01 | −4.1785E+00 | −3.3365E+00 | −1.6283E+01 | −1.8855E+01 |
| A2: | 0.0000E+00 | 0.0000E+00 | 0.0000E+00 | 0.0000E+00 | 0.0000E+00 |
| A4: | −9.7342E−02 | −1.3549E−01 | −2.5106E−02 | −2.7081E−02 | −1.9562E−02 |
| A6: | 8.8148E−02 | 2.3721E−01 | 1.2160E−01 | 5.2047E−03 | −2.4383E−03 |
| A8: | −7.8202E−02 | −1.4996E−01 | −8.6348E−03 | 4.1528E−03 | 1.9506E−03 |
| A10: | 1.2891E−02 | 2.2839E−02 | −1.0312E−02 | −6.8655E−04 | −5.6186E−04 |
| A12: | 1.2396E−02 | −3.6777E−03 | −2.9897E−03 | −7.5528E−04 | 1.2570E−05 |
| A14: | −5.2674E−03 | 4.3760E−03 | 4.9495E−03 | 2.4937E−04 | −6.4914E−06 |
| A16: | 3.7593E−04 | −7.0461E−04 | −1.2057E−03 | −1.9587E−05 | 2.1618E−06 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

In the sixth embodiment, the equation of the aspheric surface profiles of the aforementioned lenses is the same as the equation of the first embodiment.

Also, the definitions of parameters with corresponding values shown in the following table for the sixth embodiment are the same as those stated in the first embodiment, so an explanation in this regard will not be provided again. These parameters in the following table can be calculated as the following values from Table 11 and Table 12 and satisfy the following conditions:

| Embodiment 6 | |
|---|---|
| f[mm] | 1.84 |
| EPD[mm] | 1.32 |
| Fno | 1.40 |
| FOV[deg.] | 123.5 |
| IMH[mm] | 2.10 |
| FOV/(Fno*100) | 0.88 |
| (TL − BFL)/EPD | 6.66 |
| f/f1 | −0.23 |
| f/f3 | 0.68 |
| f5/f1 | 2.12 |
| f3*f5/(f2*f4) | −0.11 |
| f3*T23 | 2.74 |
| CT4/TDP7 | 0.76 |
| BFL/CT5 | 1.30 |
| CT2/CT1 | 1.40 |
| (CT1 + CT2)/(CT3 + CT4 + CT5) | 0.60 |
| TDP2/EPD | 1.27 |
| (vd1*nd1)/vd2 | 1.64 |
| R2/nd1 | 1.24 |
| TL/IMH | 4.67 |

Seventh Embodiment

Figure 7:
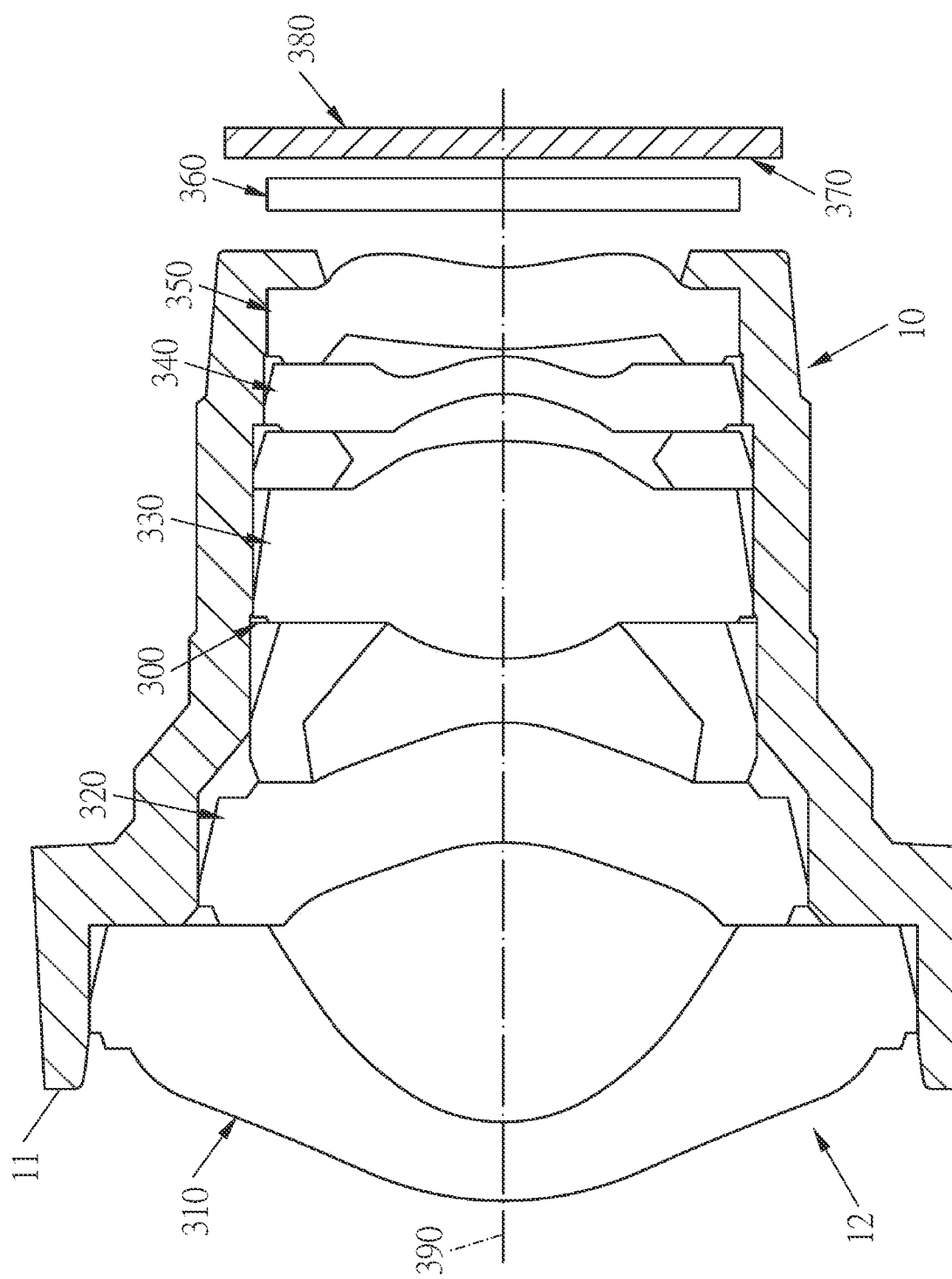
FIG. 7 shows a photographing module in accordance with a seventh embodiment of the present invention.

Referring to FIG. 7, which shows a photographing module in accordance with a third embodiment of the present invention, the photographing module 10 is applied to a notebook, but not limited to this. The photographing module 10 includes a lens barrel 11, an optical lens assembly 12 and an image sensor 380. The optical lens assembly 12 is the optical lens assembly of the above third embodiment, but not limited to this, and can also be replaced by the optical lens assembly of any other embodiment. In addition, the lenses of the optical lens assembly in FIG. 7 show the unlit peripheral parts, so these lenses in FIG. 7 are slightly different from those of the third embodiment. The optical lens assembly 12 is disposed in the lens barrel 11. The image sensor 380 is disposed on an image plane 370 of the optical lens assembly 12 and is an electronic sensor (such as, CMOS, CCD, etc.) with good photosensitivity and low noise to realize the image quality of the optical lens assembly.

For the optical lens assembly in the present invention, the lenses can be made of plastic or glass. If the lenses are made of plastic, it is conducive to reducing the manufacturing cost. If the lenses are made of glass, it is conducive to enhancing the degree of freedom in the arrangement of refractive power of the optical lens assembly. Moreover, one or both of the object-side and image-side surfaces of one or more lenses of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the present optical lens assembly, if the object-side or image-side surface of the lens with refractive power is convex and the location of the convex surface is not defined, the object-side or image-side surface of the lens in a paraxial region thereof is convex. If the object-side or image-side surface of the lens is concave and the location of the concave surface is not defined, the object-side or image-side surface of the lens in a paraxial region thereof is concave.

The optical lens assembly of the present invention can be used in optical systems with the zoom function as required, and can obtain better image quality and a better ability of aberration correction. The optical lens assembly of the present invention can also be used in electronic imaging systems, such as, 3D image capturing devices, digital cameras, mobile devices, tablet computers or vehicle cameras.

While we have shown and described various embodiments in accordance with the present invention, it should be clear to those skilled in the art that further embodiments may be made without departing from the scope of the present invention.

What is claimed is:

1. An optical lens assembly, in order from an object side to an image side, comprising:
   a first lens with negative refractive power, comprising an object-side surface and an image-side surface, the object-side surface of the first lens being convex in a paraxial region thereof, and the image-side surface of the first lens being concave in a paraxial region thereof;
   a second lens with positive refractive power, comprising an object-side surface and an image-side surface, the object-side surface of the second lens being concave in a paraxial region thereof, the image-side surface of the second lens being convex in a paraxial region thereof, and one of the object-side surface and the image-side surface of the second lens being aspheric;
   a stop;
   a third lens with positive refractive power, comprising an object-side surface and an image-side surface, the object-side surface of the third lens being convex in a paraxial region thereof, the image-side surface of the third lens being convex in a paraxial region thereof, and one of the object-side surface and the image-side surface of the third lens being aspheric;
   a fourth lens with positive refractive power, comprising an object-side surface and an image-side surface, the object-side surface of the fourth lens being concave in a paraxial region thereof, the image-side surface of the fourth lens being convex in a paraxial region thereof, and one of the object-side surface and the image-side surface of the fourth lens being aspheric;
   a fifth lens with negative refractive power, comprising an object-side surface and an image-side surface, the object-side surface of the fifth lens being convex in a paraxial region thereof, the image-side surface of the fifth lens being concave in a paraxial region thereof, and one of the object-side surface and the image-side surface of the fifth lens being aspheric; and
   an IR band-pass filter;
   wherein a maximum field of view of the optical lens assembly is FOV, a f-number of the optical lens assembly is Fno, a distance from the object-side surface of the first lens to an image plane along an optical axis is TL, a distance from the image-side surface of the fifth lens to the image plane along the optical axis is BFL, an entrance pupil diameter of the optical lens assembly is EPD, and the optical lens assembly satisfies following conditions: $0.58<FOV/(Fno*100)<1.28$; and $4.76<(TL-BFL)/EPD<12.03$.

2. The optical lens assembly as claimed in claim 1, wherein a focal length of the optical lens assembly is f, a focal length of the first lens is f1, and the optical lens assembly further satisfies a following condition: $-0.36<f/f1<-0.16$.

3. The optical lens assembly as claimed in claim 1, wherein a focal length of the optical lens assembly is f, a focal length of the third lens is f3, and the optical lens assembly further satisfies a following condition: $0.38<f/f3<0.82$.

4. The optical lens assembly as claimed in claim 1, wherein a focal length of the fifth lens is f5, a focal length of the first lens is f1, and the optical lens assembly further satisfies a following condition: $0.5<f5/f1<2.82$.

5. The optical lens assembly as claimed in claim 1, wherein a focal length of the second lens is f2, a focal length of the third lens is f3, a focal length of the fourth lens is f4, a focal length of the fifth lens is f5, and the optical lens assembly further satisfies a following condition: $-1.14<f3*f5/(f2*f4)<-0.09$.

6. The optical lens assembly as claimed in claim 1, wherein a focal length of the third lens is f3, a distance from the image-side surface of the second lens to the object-side surface of the third lens along the optical axis is T23, and the optical lens assembly further satisfies a following condition: $1.54<f3*T23<7.9$.

7. The optical lens assembly as claimed in claim 1, wherein a central thickness of the fourth lens along the optical axis is CT4, a displacement in parallel with the optical axis from an intersection between the object-side surface of the fourth lens and the optical axis to a maximum effective radius position on the object-side surface of the fourth lens is TDP7, and the optical lens assembly further satisfies a following condition: $0.61<CT4/TDP7<1.54$.

8. The optical lens assembly as claimed in claim 1, wherein the distance from the image-side surface of the fifth lens to the image plane along the optical axis is BFL, a central thickness of the fifth lens along the optical axis is CT5, and the optical lens assembly further satisfies a following condition: $1.02<BFL/CT5<2.55$.

9. The optical lens assembly as claimed in claim 1, wherein a central thickness of the second lens along the optical axis is CT2, a central thickness of the first lens along the optical axis is CT1, and the optical lens assembly further satisfies a following condition: $1.12<CT2/CT1<2.5$.

10. The optical lens assembly as claimed in claim 1, wherein a central thickness of the first lens along the optical axis is CT1, a central thickness of the second lens along the optical axis is CT2, a central thickness of the third lens along the optical axis is CT3, a central thickness of the fourth lens along the optical axis is CT4, a central thickness of the fifth lens along the optical axis is CT5, and the optical lens assembly further satisfies a following condition: $0.47<(CT1+CT2)/(CT3+CT4+CT5)<1.51$.

11. The optical lens assembly as claimed in claim 1, wherein a displacement in parallel to the optical axis from an intersection between the image-side surface of the first lens and the optical axis to a maximum effective radius position on the image-side surface of the first lens is TDP2, the entrance pupil diameter of the optical lens assembly is EPD, and the optical lens assembly further satisfies a following condition: $0.95<TDP2/EPD<2.35$.

12. The optical lens assembly as claimed in claim 1, wherein an Abbe number of the first lens is vd1, an Abbe number of the second lens is vd2, a refractive index of the first lens is nd1, and the optical lens assembly further satisfies a following condition: $1.21<(vd1*nd1)/vd2<5.57$.

13. The optical lens assembly as claimed in claim 1, wherein a radius of curvature of the image-side surface of the first lens is R2, a refractive index of the first lens is nd1, and the optical lens assembly further satisfies a following condition: $0.88<R2/nd1<2.91$.

14. The optical lens assembly as claimed in claim 1, wherein the distance from the object-side surface of the first lens to the image plane along the optical axis is TL, a maximum image height of the optical lens assembly is IMH, and the optical lens assembly further satisfies a following condition: 3.68<TL/IMH<5.92.

15. A photographing module, comprising:
a lens barrel,
an optical lens assembly disposed in the lens barrel, and
an image sensor disposed on an image plane of the optical lens assembly,
wherein the optical lens assembly, in order from an object side to an image side, comprises:
  a first lens with negative refractive power, comprising an object-side surface and an image-side surface, the object-side surface of the first lens being convex in a paraxial region thereof, and the image-side surface of the first lens being concave in a paraxial region thereof;
  a second lens with positive refractive power, comprising an object-side surface and an image-side surface, the object-side surface of the second lens being concave in a paraxial region thereof, the image-side surface of the second lens being convex in a paraxial region thereof, and one of the object-side surface and the image-side surface of the second lens being aspheric;
  a stop;
  a third lens with positive refractive power, comprising an object-side surface and an image-side surface, the object-side surface of the third lens being convex in a paraxial region thereof, the image-side surface of the third lens being convex in a paraxial region thereof, and one of the object-side surface and the image-side surface of the third lens being aspheric;
  a fourth lens with positive refractive power, comprising an object-side surface and an image-side surface, the object-side surface of the fourth lens being concave in a paraxial region thereof, the image-side surface of the fourth lens being convex in a paraxial region thereof, and one of the object-side surface and the image-side surface of the fourth lens being aspheric;
  a fifth lens with negative refractive power, comprising an object-side surface and an image-side surface, the object-side surface of the fifth lens being convex in a paraxial region thereof, the image-side surface of the fifth lens being concave in a paraxial region thereof, and one of the object-side surface and the image-side surface of the fifth lens being aspheric; and
  an IR band-pass filter;

wherein a maximum field of view of the optical lens assembly is FOV, a f-number of the optical lens assembly is Fno, a distance from the object-side surface of the first lens to the image plane along an optical axis is TL, a distance from the image-side surface of the fifth lens to the image plane along the optical axis is BFL, an entrance pupil diameter of the optical lens assembly is EPD, and the optical lens assembly satisfies following conditions: 0.58<FOV/(Fno*100)<1.28; and 4.76<(TL−BFL)/EPD<12.03.

16. The photographing module as claimed in claim 15, wherein a central thickness of the fourth lens along the optical axis is CT4, a displacement in parallel to the optical axis from an intersection between the object-side surface of the fourth lens and the optical axis to a maximum effective radius position on the object-side surface of the fourth lens is TDP7, and the optical lens assembly further satisfies a following condition: 0.61<CT4/TDP7<1.54.

17. The photographing module as claimed in claim 15, wherein a central thickness of the first lens along the optical axis is CT1, a central thickness of the second lens along the optical axis is CT2, a central thickness of the third lens along the optical axis is CT3, a central thickness of the fourth lens along the optical axis is CT4, a central thickness of the fifth lens along the optical axis is CT5, and the optical lens assembly further satisfies a following condition: 0.47<(CT1+CT2)/(CT3+CT4+CT5)<1.51.

18. The photographing module as claimed in claim 15, wherein a displacement in parallel to the optical axis from an intersection between the image-side surface of the first lens and the optical axis to a maximum effective radius position on the image-side surface of the first lens is TDP2, the entrance pupil diameter of the optical lens assembly is EPD, and the optical lens assembly further satisfies a following condition: 0.95<TDP2/EPD<2.35.

19. The photographing module as claimed in claim 15, wherein a radius of curvature of the image-side surface of the first lens is R2, a refractive index of the first lens is nd1, and the optical lens assembly further satisfies a following condition: 0.88<R2/nd1<2.91.

20. The photographing module as claimed in claim 15, wherein the distance from the object-side surface of the first lens to the image plane along the optical axis is TL, a maximum image height of the optical lens assembly is IMH, and the optical lens assembly further satisfies a following condition: 3.68<TL/IMH<5.92.

* * * * *